United States Patent
Hsu et al.

(10) Patent No.: US 7,837,901 B2
(45) Date of Patent: *Nov. 23, 2010

(54) ELECTRICALLY CONDUCTIVE POLYMER COMPOSITIONS

(75) Inventors: Che-Hsiung Hsu, Wilmingtion, DE (US); Christopher P. Junk, Wilmington, DE (US); Frank P. Uckert, Buellton, DE (US); Mark F. Teasley, Landenberg, PA (US); Andrew Edward Feiging, Wilmington, DE (US); Charles J. Dubois, Wilmington, DE (US); Natalie Daoud, Santa Barbara, CA (US); Viascheslav A. Petrov, Hockessin, DE (US); Zheng-Yu Yang, Hockessin, DE (US); Amy Qi Han, legal representative, Hockessin, DE (US)

(73) Assignees: E. I. du Pont de Nemours and Company, Wilmington, DE (US); DuPont Displays Inc, Wilmington, DE (US)

( * ) Notice: Subject to any disclaimer, the term of this patent is extended or adjusted under 35 U.S.C. 154(b) by 584 days.

This patent is subject to a terminal disclaimer.

(21) Appl. No.: 11/475,715

(22) Filed: Jun. 27, 2006

(65) Prior Publication Data

US 2007/0069185 A1 Mar. 29, 2007

Related U.S. Application Data

(60) Provisional application No. 60/694,277, filed on Jun. 27, 2005.

(51) Int. Cl.
*H01B 1/00* (2006.01)
*C08G 75/00* (2006.01)
*C08G 75/32* (2006.01)

(52) U.S. Cl. .................. 252/500; 528/377; 528/378
(58) Field of Classification Search .................. 252/500; 528/377, 378
See application file for complete search history.

(56) References Cited

U.S. PATENT DOCUMENTS 4,933,106 A 6/1990 Sakai .................. 252/500

(Continued)

FOREIGN PATENT DOCUMENTS

EP 0 269 090 B1 6/1988

(Continued)

OTHER PUBLICATIONS

PCT International Search Report and Written Opinion for International Application No. PCT/US 06/25013 dated Jan. 16, 2007.

(Continued)

*Primary Examiner*—Mark Kopec
*Assistant Examiner*—Jaison P Thomas
(74) *Attorney, Agent, or Firm*—John H. Lamming

(57) ABSTRACT

There are provided electrically conducting polymer compositions comprising an electrically conductive polymer or copolymer and an organic solvent wettable fluorinated acid polymer. Electrically conductive polymer materials are derived from thiophene, pyrrole, aniline and polycyclic heteroaromatic precursor monomers. Non-conductive polymers derived from alkenyl, alkynyl, arylene, and heteroarylene precursor monomers. The organic-solvent wettable fluorinated acid polymer is fluorinated or highly fluorinated and may be colloid-forming. Acidic groups include carboxylic acid groups, sulfonic acid groups, sulfonimide groups, phosphoric acid groups, phosphonic acid groups, and combinations thereof. The compositions can be used in organic electronic devices.

21 Claims, 1 Drawing Sheet

U.S. PATENT DOCUMENTS

| | | | |
|---|---|---|---|
| 5,300,575 | A | 4/1994 | Jonas et al. |
| 5,370,981 | A | 12/1994 | Krafft .......................... 430/529 |
| 5,463,005 | A * | 10/1995 | Desmarteau ................ 526/240 |
| 6,083,635 | A | 7/2000 | Jonas .......................... 428/690 |
| 6,150,426 | A | 11/2000 | Curtin et al. |
| 6,303,238 | B1 | 10/2001 | Thompson et al. |
| 6,340,496 | B1 | 1/2002 | Cloots .......................... 427/58 |
| 6,376,105 | B1 | 4/2002 | Jonas .......................... 428/690 |
| 6,391,481 | B1 | 5/2002 | Jonas .......................... 428/690 |
| 6,670,645 | B2 | 12/2003 | Grushin et al. |
| 6,759,441 | B1 | 7/2004 | Kerres et al. |
| 7,354,532 | B2 * | 4/2008 | Hsu et al. .................... 252/511 |
| 2002/0045713 | A1 * | 4/2002 | Feiring et al. ............. 525/326.2 |
| 2002/0136923 | A1 | 9/2002 | Jonas .......................... 428/690 |
| 2004/0044214 | A1 | 3/2004 | Andriessen |
| 2004/0102577 | A1 * | 5/2004 | Hsu et al. .................... 525/182 |
| 2004/0127637 | A1 | 7/2004 | Hsu et al. |
| 2004/0206942 | A1 * | 10/2004 | Hsu .......................... 252/500 |
| 2004/0254297 | A1 * | 12/2004 | Hsu et al. ................... 525/54.2 |
| 2005/0033015 | A1 | 2/2005 | Pei |
| 2005/0049319 | A1 | 3/2005 | Stone et al. |
| 2005/0059168 | A1 | 3/2005 | Bazan et al. |

FOREIGN PATENT DOCUMENTS

| | | |
|---|---|---|
| EP | 0 593 111 A1 | 4/1994 |
| EP | 1 384 739 B1 | 10/2007 |
| JP | 2003-297582 A1 | 10/2003 |
| JP | 4363050 B1 | 10/2003 |
| WO | WO 00/70655 A2 | 11/2000 |
| WO | WO 01/41512 A1 | 6/2001 |
| WO | WO 02-080627 A1 | 10/2002 |
| WO | WO 03/008424 A1 | 1/2003 |
| WO | WO 03/040257 A1 | 5/2003 |
| WO | WO 03/063555 A1 | 7/2003 |
| WO | WO 03/091688 A2 | 11/2003 |
| WO | WO 2004/016710 A1 | 2/2004 |
| WO | WO 2004/106409 A1 | 12/2004 |

OTHER PUBLICATIONS

Kyunghoon Lee et al., Poly(Thieno[3,4-b]Thiophene). A New Stable Low Band Gap Conducting Polymer, Macromolecules, 2001, vol. 34:5746-5747.

Gregory A. Sotzing et al., Poly(Thieno[3,4-b]Thiophene): A p- n-Dopable Polythiophene Exhibiting High Optical Transparency in the Semiconducting State, Macromolecules, 2002, vol. 35:7281-7286.

G. Gustafsson et al., Flexible Light-Emitting Diodes Made From Soluble Conducting Polymers, Nature, 1992, vol. 357:477-479.

Y. Wang, Kirk-Othmer Encyclopedia of Chemical Technology, Fourth Edition, 1996, vol. 18:837-860.

Feiring, A.E. and Wonchoba, E.R., Aromatic monomers with pendant fluoroalkylsulfonate and sulfonimide groups, Journal of Fluorine Chemistry, 105[1], 129-135, Jul. 1, 2000, Elsevier Science SA [NL], XP004216216, ISSN: 0022-1139.

Agibalova, L.V. et al., Supramolecular Organization of polyfluorinated copolymers in solutions, Database CA [Online] Chemical Abstracts Service, Jun. 7, 1999, American Chemical Society, Columbus, Ohio, U.S.A., XP002564423, Database Accession No. 1999:343805; [Agibalova, L.V. et al., Supramolecular Organization of polyfluorinated copolymers in solutions, Vysokomolekulyarnye Soedineniya, Seriya A I Seriya B, 40 [6], 1009-1016, 1998, Research Institute of Synthetic Rubber, St. Petersburg, Russia; *English translation* in Polymer Science, 40[6] Series A, 615-621, 1998].

Appleby, A.J. et al., Polymeric Perfluoro Bis-Sulfonimides as Possible Fuel Cell Electrolytes, Journal of the Electrochemical Society, 140[1], 109-111, Jan. 1, 1993, Electrochemical Society, Manchester, New Hampshire, U.S.A., XP000548045, USSN: 0013-4651.

EP Application 06 78 5660, EP counterpart of the present application, European Search Report and Opinion, Supplemental Search Report, Munich, Germany, Apr. 4, 2010.

* cited by examiner

US 7,837,901 B2

ELECTRICALLY CONDUCTIVE POLYMER COMPOSITIONS

RELATED U.S. APPLICATIONS

This application claims priority to U.S. provisional application, Ser. No. 60/694277, filed Jun. 27, 2005.

BACKGROUND INFORMATION

1. Field of the Disclosure

This disclosure relates in general to electrically conductive polymer compositions, and their use in organic electronic devices.

2. Description of the Related Art

Organic electronic devices define a category of products that include an active layer. Such devices convert electrical energy into radiation, detect signals through electronic processes, convert radiation into electrical energy, or include one or more organic semiconductor layers.

Organic light-emitting diodes (OLEDs) are an organic electronic device comprising an organic layer capable of electroluminescence. OLEDs containing conducting polymers can have the following configuration:

anode/buffer layer/EL material/cathode

Additional, optional layers, materials or compositions may also be incorporated into this general structure. The anode is typically any material that has the ability to inject holes into the EL material, such as, for example, indium/tin oxide (ITO). The anode is optionally supported on a glass or plastic substrate. EL materials include fluorescent compounds, fluorescent and phosphorescent metal complexes, conjugated polymers, and mixtures thereof. The cathode is typically any material (such as, e.g., Ca or Ba) that has the ability to inject electrons into the EL material.

The buffer layer is typically an electrically conducting polymer and facilitates the injection of holes from the anode into the EL material layer. Typical conducting polymers employed as buffer layers include polyaniline and polydioxythiophenes such as poly(3,4-ethylenedioxythiophene) (PEDT). These materials can be prepared by polymerizing aniline or dioxythiophene monomers in aqueous solution in the presence of a water soluble polymeric acid, such as poly(styrenesulfonic acid) (PSS), as described in, for example, U.S. Pat. No. 5,300,575.

The aqueous electrically conductive polymer dispersions synthesized with water soluble non-fluorinated polymeric acids have undesirably low pH levels. The low pH can contribute to decreased stress life of an EL device containing such a buffer layer, and contribute to corrosion within the device. Accordingly, there is a need for compositions and layers prepared therefrom having improved properties.

Electrically conducting polymers which have the ability to carry a high current when subjected to a low electrical voltage, also have utility as electrodes for electronic devices, such as thin film field effect transistors. In such transistors, an organic semiconducting film which has high mobility for electron and/or hole charge carriers, is present between source and drain electrodes. A gate electrode is on the opposite side of the semiconducting polymer layer. To be useful for the electrode application, the electrically conducting polymers and the liquids for dispersing or dissolving the electrically conducting polymers have to be compatible with the semiconducting polymers and the solvents for the semiconducting polymers to avoid re-dissolution of either conducting polymers or semiconducting polymers. Many conductive polymers have conductivities which are too low for use as electrodes. Accordingly, there is a need for improved conductive polymers.

Thus, there is a continuing need for electrically conductive polymer compositions having improved chemical, physical and electrical properties.

SUMMARY

There is provided an electrically conductive polymer composition, comprising an electrically conductive polymer and an organic solvent wettable fluorinated acid polymer.

In one embodiment, the polymeric acid is a water-soluble fluorinated sulfonic acid polymer.

In another embodiment, there is provided an aqueous dispersion of an electrically conductive polymer and an organic solvent wettable fluorinated acid polymer.

In another embodiment, there is provided a method for producing an electrically conductive polymer composition, said method comprising forming a combination of water, at least one precursor monomer, at least one organic solvent wettable fluorinated acid polymer, and an oxidizing agent, in any order, provided that at least a portion of the organic solvent wettable fluorinated acid polymer is present when at least one of the conductive monomer and the oxidizing agent is added.

In another embodiment, electronic devices comprising at least one layer comprising the new conductive polymer composition are provided.

Figure 1:
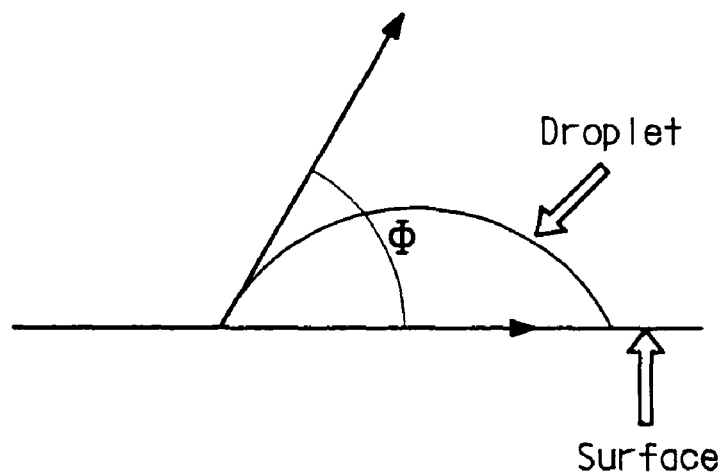
FIG. 1 is a diagram illustrating contact angle.

The figure(s) are provided by way of example and are not intended to limit the invention. Skilled artisans appreciate that objects in the figures are illustrated for simplicity and clarity and have not necessarily been drawn to scale. For example, the dimensions of some of the objects in the figures may be magnified relative to other objects to help to improve understanding of embodiments.

The foregoing general description and the following detailed description are exemplary and explanatory and are not restrictive of the invention, as defined in the appended claims.

DETAILED DESCRIPTION

In one embodiment, there is provided an electrically conductive polymer composition, comprising an electrically conductive polymer and an organic solvent wettable fluorinated acid polymer.

Many aspects and embodiments are described herein and are exemplary and not limiting. After reading this specification, skilled artisans will appreciate that other aspects and embodiments are possible without departing from the scope of the disclosure or the appended claims.

As used herein, the term "electrically conductive polymer" refers to a polymer or oligomer that is inherently or intrinsically capable of electrical conductivity without the addition of carbon black or conductive metal particles. The term "polymer" encompasses homopolymers and copolymers. The term "electrical conductivity" includes conductive and semi-conductive. In some embodiments, the electrically conductive polymer is conductive in a protonated form and not conductive in an unprotonated form. The term "organic solvent wettable" refers to a material which, when formed into a film, is wettable by organic solvents. The term also includes polymeric acids that are not film-forming alone, but which form an electrically conductive polymer composition which is wettable. In one embodiment, organic solvent wettable materials form films which are wettable by phenylhexane with a contact angle no greater than 40°. The term "fluorinated acid polymer" refers to a polymer having acidic groups, where at least some of the hydrogens have been replaced by fluorine. The term "acidic group" refers to a group capable of ionizing to donate a hydrogen ion to a base. The composition may comprise one or more different electrically conductive polymers and one or more different organic solvent wettable fluorinated acid polymers.

Any electrically conductive polymer can be used in the new composition. In one embodiment, the electrically conductive polymer will form a film which has a conductivity of at least $10^{-7}$ S/cm.

The conductive polymers suitable for the new composition can be homopolymers, or they can be co-polymers of two or more respective monomers, which may vary as structural repeat units or which may vary as the same structural repeat unit with different substituents. The composition may comprise one or more different conductive polymers and one or more different organic solvent wettable fluorinated acid polymer. In one embodiment, the conductive polymer is selected from polythiophenes, polypyrroles, polyanilines, and polycyclic aromatic polymers. The term "polycyclic aromatic" refers to compounds having more than one aromatic ring. The rings may be joined by one or more bonds, or they may be fused together. The term "aromatic ring" is intended to include heteroaromatic rings. A "polycyclic heteroaromatic" compound has at least one heteroaromatic ring.

The monomer from which the conductive polymer is formed, is referred to as a "precursor monomer". A copolymer will have more than one precursor monomer.

In one embodiment, polythiophenes contemplated for use in the new composition comprise Formula I below:

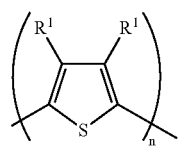

(I)

wherein:

R$^1$ is independently selected so as to be the same or different at each occurrence and is selected from hydrogen, alkyl, alkenyl, alkoxy, alkanoyl, alkythio, aryloxy, alkylthioalkyl, alkylaryl, arylalkyl, amino, alkylamino, dialkylamino, aryl, alkylsulfinyl, alkoxyalkyl, alkylsulfonyl, arylthio, arylsulfinyl, alkoxycarbonyl, arylsulfonyl, acrylic acid, phosphoric acid, phosphonic acid, halogen, nitro, cyano, hydroxyl, epoxy, silane, siloxane, alcohol, benzyl, carboxylate, ether, ether carboxylate, amidosulfonate, ether sulfonate, ester sulfonate, and urethane; or both R$^1$ groups together may form an alkylene or alkenylene chain completing a 3, 4, 5, 6, or 7-membered aromatic or alicyclic ring, which ring may optionally include one or more divalent nitrogen, sulfur or oxygen atoms, and n is at least about 4.

As used herein, the term "alkyl" refers to a group derived from an aliphatic hydrocarbon and includes linear, branched and cyclic groups which may be unsubstituted or substituted. The term "heteroalkyl" is intended to mean an alkyl group, wherein one or more of the carbon atoms within the alkyl group has been replaced by another atom, such as nitrogen, oxygen, sulfur, and the like. The term "alkylene" refers to an alkyl group having two points of attachment.

As used herein, the term "alkenyl" refers to a group derived from an aliphatic hydrocarbon having at least one carbon-carbon double bond, and includes linear, branched and cyclic groups which may be unsubstituted or substituted. The term "heteroalkenyl" is intended to mean an alkenyl group, wherein one or more of the carbon atoms within the alkenyl group has been replaced by another atom, such as nitrogen, oxygen, sulfur, and the like. The term "alkenylene" refers to an alkenyl group having two points of attachment.

As used herein, the following terms for substituent groups refer to the formulae given below:

"alcohol" —R$^3$—OH
"amido" —R$^3$—C(O)N(R$^6$)R$^6$
"amidosulfonate" —R$^3$—C(O)N(R$^6$)R$^4$—SO$_3$Z
"benzyl" —CH$_2$—C$_6$H$_5$
"carboxylate" —R$^3$—C(O)O—Z or —R$^3$—O—C(O)—Z
"ether" —R$^3$—(O—R$^5$)$_p$—O—R$^5$
"ether carboxylate" —R$^3$—O—R$^4$—C(O)O—Z or —R$^3$—O—R$^4$—O—C(O)—Z
"ether sulfonate" —R$^3$—O—R$^4$—SO$_3$Z
"ester sulfonate" —R$^3$—O—C(O)—R$^4$—SO$_3$Z
"sulfonimide" —R$^3$—SO$_2$—NH—SO$_2$—R$^5$
"urethane" —R$^3$—O—C(O)—N(R$^6$)$_2$ where all "R" groups are the same or different at each occurrence and:
R$^3$ is a single bond or an alkylene group
R$^4$ is an alkylene group
R$^5$ is an alkyl group
R$^6$ is hydrogen or an alkyl group
p is 0 or an integer from 1 to 20
Z is H, alkali metal, alkaline earth metal, N(R$^5$)$_4$ or R$^5$ Any of the above groups may further be unsubstituted or substituted, and any group may have F substituted for one or more hydrogens, including perfluorinated groups.

In one embodiment, in the polythiophene both R$^1$ together form —O—(CHY)$_m$—O—, where m is 2 or 3, and Y is the same or different at each occurrence and is selected from hydrogen, alkyl, alcohol, amidosulfonate, benzyl, carboxylate, ether, ether carboxylate, ether sulfonate, ester sulfonate, and urethane. In one embodiment, all Y are hydrogen. In one embodiment, the polythiophene is poly(3,4-ethylenedioxythiophene). In one embodiment, at least one Y group is not hydrogen. In one embodiment, at least one Y group is a substituent having F substituted for at least one hydrogen. In one embodiment, at least one Y group is perfluorinated.

In one embodiment, the polythiophene contemplated for use in the new composition has Formula I(a):

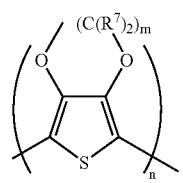

(Ia)

wherein:

R⁷ is the same or different at each occurrence and is selected from hydrogen, alkyl, heteroalkyl, alkenyl, heteroalkenyl, alcohol, amidosulfonate, benzyl, carboxylate, ether, ether carboxylate, ether sulfonate, ester sulfonate, and urethane, with the proviso that at least one R⁷ is not hydrogen.

m is 2 or 3, and n is at least about 4.

In one embodiment of Formula I(a), m is two, one R⁷ is an alkyl group of more than 5 carbon atoms, and all other R⁷ are hydrogen. In one embodiment of Formula I(a), at least one R⁷ group is fluorinated. In one embodiment, at least one R⁷ group has at least one fluorine substituent. In one embodiment, the R⁷ group is fully fluorinated.

In one embodiment of Formula I(a), the R⁷ substituents on the fused alicyclic ring on the thiophene offer improved solubility of the monomers in water and facilitate polymerization in the presence of the fluorinated acid polymer.

In one embodiment of Formula I(a), m is 2, one R⁷ is sulfonic acid-propylene-ether-methylene and all other R⁷ are hydrogen. In one embodiment, m is 2, one R⁷ is propyl-ether-ethylene and all other R⁷ are hydrogen. In one embodiment, m is 2, one R⁷ is methoxy and all other R⁷ are hydrogen. In one embodiment, one R⁷ is sulfonic acid difluoromethylene ester methylene (—CH₂—O—C(O)—CF₂—SO₃H), and all other R⁷ are hydrogen.

In one embodiment, polypyrroles contemplated for use in the new composition comprise Formula II below.

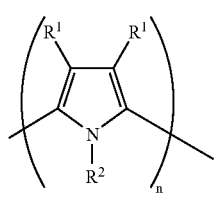

where in Formula II:

n is at least about 4;

R¹ is independently selected so as to be the same or different at each occurrence and is selected from hydrogen, alkyl, alkenyl, alkoxy, alkanoyl, alkythio, aryloxy, alkylthioalkyl, alkylaryl, arylalkyl, amino, alkylamino, dialkylamino, aryl, alkylsulfinyl, alkoxyalkyl, alkylsulfonyl, arylthio, arylsulfinyl, alkoxycarbonyl, arylsulfonyl, acrylic acid, phosphoric acid, phosphonic acid, halogen, nitro, cyano, hydroxyl, epoxy, silane, siloxane, alcohol, benzyl, carboxylate, ether, amidosulfonate, ether carboxylate, ether sulfonate, ester sulfonate, and urethane; or both R¹ groups together may form an alkylene or alkenylene chain completing a 3, 4, 5, 6, or 7-membered aromatic or alicyclic ring, which ring may optionally include one or more divalent nitrogen, sulfur or oxygen atoms; and R² is independently selected so as to be the same or different at each occurrence and is selected from hydrogen, alkyl, alkenyl, aryl, alkanoyl, alkylthioalkyl, alkylaryl, arylalkyl, amino, epoxy, silane, siloxane, alcohol, benzyl, carboxylate, ether, ether carboxylate, ether sulfonate, ester sulfonate, and urethane.

In one embodiment, R¹ is the same or different at each occurrence and is independently selected from hydrogen, alkyl, alkenyl, alkoxy, cycloalkyl, cycloalkenyl, alcohol, benzyl, carboxylate, ether, amidosulfonate, ether carboxylate, ether sulfonate, ester sulfonate, urethane, epoxy, silane, siloxane, and alkyl substituted with one or more of sulfonic acid, carboxylic acid, acrylic acid, phosphoric acid, phosphonic acid, halogen, nitro, cyano, hydroxyl, epoxy, silane, or siloxane moieties.

In one embodiment, R² is selected from hydrogen, alkyl, and alkyl substituted with one or more of sulfonic acid, carboxylic acid, acrylic acid, phosphoric acid, phosphonic acid, halogen, cyano, hydroxyl, epoxy, silane, or siloxane moieties.

In one embodiment, the polypyrrole is unsubstituted and both R¹ and R² are hydrogen.

In one embodiment, both R¹ together form a 6- or 7-membered alicyclic ring, which is further substituted with a group selected from alkyl, heteroalkyl, alcohol, benzyl, carboxylate, ether, ether carboxylate, ether sulfonate, and urethane. These groups can improve the solubility of the monomer and the resulting polymer. In one embodiment, both R¹ together form a 6- or 7-membered alicyclic ring, which is further substituted with an alkyl group. In one embodiment, both R¹ together form a 6- or 7-membered alicyclic ring, which is further substituted with an alkyl group having at least 1 carbon atom.

In one embodiment, both R¹ together form —O—(CHY)ₘ—O—, where m is 2 or 3, and Y is the same or different at each occurrence and is selected from hydrogen, alkyl, alcohol, benzyl, carboxylate, amidosulfonate, ether, ether carboxylate, ether sulfonate, and urethane. In one embodiment, at least one Y group is not hydrogen. In one embodiment, at least one Y group is a substituent having F substituted for at least one hydrogen. In one embodiment, at least one Y group is perfluorinated.

Polyanilines contemplated for use in the new composition comprise Formula III or Formula IV below.

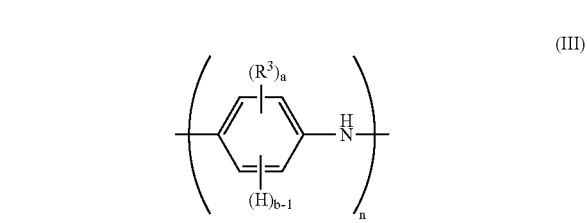

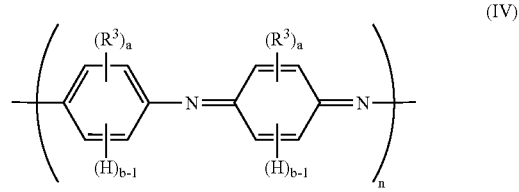

wherein:

n is at least about 4;

a is an integer from 0 to 4;

b is an integer from 1 to 5, with the proviso that a+b=5; and

R³ is independently selected so as to be the same or different at each occurrence and is selected from alkyl, alkenyl, alkoxy, cycloalkyl, cycloalkenyl, alkanoyl, alkythio, aryloxy, alkylthioalkyl, alkylaryl, arylalkyl, amino, alkylamino, dialkylamino, aryl, alkylsulfinyl, alkoxyalkyl, alkylsulfonyl, arylthio, arylsulfinyl, alkoxycarbonyl, arylsulfonyl, carboxylic acid, halogen, cyano, or alkyl substituted with one or more of sulfonic acid, carboxylic acid, halo, nitro, cyano or epoxy moieties; or any two R³ groups together may form an alkylene or alkenylene chain completing a 3, 4, 5, 6, or 7-membered aromatic or alicyclic ring, which ring may optionally include one or more divalent nitrogen, sulfur or oxygen atoms.

In one embodiment, the polyaniline is unsubstituted and p=0.

In one embodiment, a is not 0 and at least one $R^3$ is fluorinated. In one embodiment, at least one $R^3$ is perfluorinated.

In one embodiment, polymeric fused polycylic heteroaromatics contemplated for use in the new composition are polymers derived from monomeric compounds having two or more fused aromatic rings, at least one of which is heteroaromatic. In one embodiment, the fused polycyclic heteroaromatic monomer has Formula V:

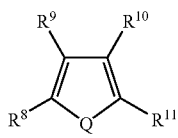

(V)

wherein:

Q is S or NH;

$R^8, R^9, R^{10}$, and $R^{11}$ are independently selected so as to be the same or different at each occurrence and are selected from hydrogen, alkyl, alkenyl, alkoxy, alkanoyl, alkythio, aryloxy, alkylthioalkyl, alkylaryl, arylalkyl, amino, alkylamino, dialkylamino, aryl, alkylsulfinyl, alkoxyalkyl, alkylsulfonyl, arylthio, arylsulfinyl, alkoxycarbonyl, arylsulfonyl, acrylic acid, phosphoric acid, phosphonic acid, halogen, nitro, cyano, hydroxyl, epoxy, silane, siloxane, alcohol, benzyl, carboxylate, ether, ether carboxylate, amidosulfonate, ether sulfonate, ester sulfonate, and urethane; and at least one of $R^8$ and $R^9$, $R^9$ and $R^{10}$, and $R^{10}$ and $R^{11}$ together form an alkenylene chain completing a 5 or 6-membered aromatic ring, which ring may optionally include one or more divalent nitrogen, sulfur or oxygen atoms.

In one embodiment, the fused polycyclic heteroaromatic monomer has Formula V(a), V(b), V(c), V(d), V(e), V(f), and V(g):

(Va)

(Vb)

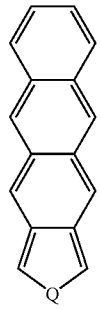

(Vc)

(Vd)

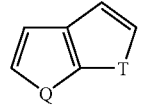

(Ve)

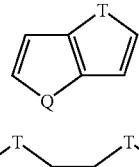

(Vf)

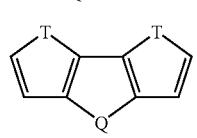

(Vg)

wherein:

Q is S or NH; and

T is the same or different at each occurrence and is selected from S, $NR^6$, O, $SiR^6_2$, Se, and $PR^6$;

$R^6$ is hydrogen or alkyl.

The fused polycyclic heteroaromatic precursor monomers may be substituted with groups selected from alkyl, heteroalkyl, alcohol, benzyl, carboxylate, ether, ether carboxylate, ether sulfonate, ester sulfonate, and urethane. In one embodiment, the substituent groups are fluorinated. In one embodiment, the substituent groups are fully fluorinated.

In one embodiment, the fused polycyclic heteroaromatic precursor monomer is a thieno(thiophene). Such compounds have been discussed in, for example, Macromolecules, 34, 5746-5747 (2001); and Macromolecules, 35, 7281-7286 (2002). In one embodiment, the thieno(thiophene) is selected from thieno(2,3-b)thiophene, thieno(3,2-b)thiophene, and thieno(3,4-b)thiophene. In one embodiment, the thieno(thiophene) monomer is substituted with at least one group selected from alkyl, heteroalkyl, alcohol, benzyl, carboxylate, ether, ether carboxylate, ether sulfonate, ester sulfonate, and urethane. In one embodiment, the substituent groups are fluorinated. In one embodiment, the substituent groups are fully fluorinated.

In one embodiment, polycyclic heteroaromatic polymers contemplated for use in the new composition, are derived from monomers comprising Formula VI:

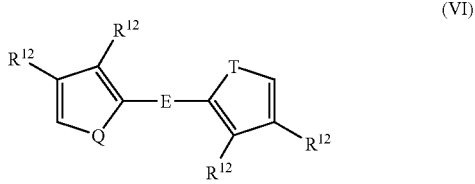

(VI)

wherein:

Q is S or NR$^6$;

T is selected from S, NR$^6$, O, SiR$^6{}_2$, Se, and PR$^6$;

E is selected from alkenylene, arylene, and heteroarylene;

R$^6$ is hydrogen or alkyl;

R$^{12}$ is the same or different at each occurrence and is selected from hydrogen, alkyl, alkenyl, alkoxy, alkanoyl, alkythio, aryloxy, alkylthioalkyl, alkylaryl, arylalkyl, amino, alkylamino, dialkylamino, aryl, alkylsulfinyl, alkoxyalkyl, alkylsulfonyl, arylthio, arylsulfinyl, alkoxycarbonyl, arylsulfonyl, acrylic acid, phosphoric acid, phosphonic acid, halogen, nitro, nitrile, cyano, hydroxyl, epoxy, silane, siloxane, alcohol, benzyl, carboxylate, ether, ether carboxylate, amidosulfonate, ether sulfonate, ester sulfonate, and urethane; or both R$^{12}$ groups together may form an alkylene or alkenylene chain completing a 3, 4, 5, 6, or 7-membered aromatic or alicyclic ring, which ring may optionally include one or more divalent nitrogen, sulfur or oxygen atoms.

In one embodiment, the electrically conductive polymer is a copolymer of a precursor monomer and at least one second monomer. Any type of second monomer can be used, so long as it does not detrimentally affect the desired properties of the copolymer. In one embodiment, the second monomer comprises no more than 50% of the copolymer, based on the total number of monomer units. In one embodiment, the second monomer comprises no more than 30%, based on the total number of monomer units. In one embodiment, the second monomer comprises no more than 10%, based on the total number of monomer units.

Exemplary types of second monomers include, but are not limited to, alkenyl, alkynyl, arylene, and heteroarylene. Examples of second monomers include, but are not limited to, fluorene, oxadiazole, thiadiazole, benzothiadiazole, phenylenevinylene, phenyleneethynylene, pyridine, diazines, and triazines, all of which may be further substituted.

In one embodiment, the copolymers are made by first forming an intermediate precursor monomer having the structure A-B-C, where A and C represent first precursor monomers, which can be the same or different, and B represents a second precursor monomer. The A-B-C intermediate precursor monomer can be prepared using standard synthetic organic techniques, such as Yamamoto, Stille, Grignard metathesis, Suzuki, and Negishi couplings. The copolymer is then formed by oxidative polymerization of the intermediate precursor monomer alone, or with one or more additional precursor monomers.

In one embodiment, the electrically conductive polymer is a copolymer of two or more precursor monomers. In one embodiment, the precursor monomers are selected from a thiophene, a pyrrole, an aniline, and a polycyclic aromatic.

The polymers made from precursor monomers having thiophene or pyrrole groups and formed by oxidative polymerization are positively charged. In the conductive form of polymers made from aniline precursor monomers, at least some of the nitrogens are protonated, so that the polymer also is positively charged. The positive charges are balanced by the fluorinated acid polymer anions.

The organic-solvent wettable fluorinated acid polymer can be any water-soluble or water dispersible polymer which is fluorinated and has acidic groups. As used herein, the term "fluorinated" means that at least one hydrogen bonded to a carbon has been replaced with a fluorine. Fluorination can occur on the polymer backbone, side chains, or pendant groups, or combinations of those. The term includes partially and fully fluorinated materials. In one embodiment, the fluorinated acid polymer is highly fluorinated. The term "highly fluorinated" means that at least 50% of the available hydrogens bonded to a carbon, have been replaced with fluorine. The acidic groups supply an ionizable proton. In one embodiment, the acidic group has a pKa of less than 3. In one embodiment, the acidic group has a pKa of less than 0. In one embodiment, the acidic group has a pKa of less than −5. The acidic group can be attached directly to the polymer backbone, or it can be attached to side chains or pendant groups on the polymer backbone. Examples of acidic groups include, but are not limited to, carboxylic acid groups, sulfonic acid groups, sulfonimide groups, phosphoric acid groups, phosphonic acid groups, and combinations thereof. The acidic groups can all be the same, or the polymer may have more than one type of acidic group.

In one embodiment, the organic solvent wettable fluorinated acid polymer forms a film which is wettable by phenylhexane. In one embodiment, phenylhexane forms drops having a contact angle no greater than 40°. As used herein, the term "contact angle" is intended to mean the angle ϕ shown in FIG. 1. For a droplet of liquid medium, angle ϕ is defined by the intersection of the plane of the surface and a line from the outer edge of the droplet to the surface. Furthermore, angle ϕ is measured after the droplet has reached an equilibrium position on the surface after being applied, i.e. "static contact angle". The film of the organic solvent wettable fluorinated acid polymer is represented as the surface. In one embodiment, the contact angle is no greater than 35°. In one embodiment, the contact angle is no greater than 30°. The methods for measuring contact angles are well known.

In one embodiment of the organic solvent wettable fluorinated acid polymer, the polymer backbone is fluorinated. Examples of suitable polymeric backbones include, but are not limited to, polyolefins, polyacrylates, polymethacrylates, polyimides, polyamides, polyaramids, polyacrylamides, polystyrenes, and copolymers thereof. In one embodiment, the polymer backbone is highly fluorinated. In one embodiment, the polymer backbone is fully fluorinated.

In one embodiment, the acidic groups are selected from sulfonic acid groups and sulfonimide groups. In one embodiment, the acidic groups are on a fluorinated side chain. In one embodiment, the fluorinated side chains are selected from alkyl groups, alkoxy groups, amido groups, ether groups, and combinations thereof.

In one embodiment, the fluorinated acid polymer has a fluorinated olefin backbone, with pendant fluorinated ether sulfonate groups or fluorinated ether sulfonimide groups. In one embodiment, the polymer is a copolymer of 1,1-difluoroethylene and 2-(1,1-difluoro-2-(trifluoromethyl)allyloxy)-1,1,2,2-tetrafluoroethanesulfonic acid. In one embodiment, the polymer is a copolymer of ethylene and 2-(2-(1,2,2-trifluorovinyloxy)-1,1,2,3,3,3-hexafluoropropoxy)-1,1,2,2-tetrafluoroethanesulfonic acid. These copolymers can be made as the corresponding sulfonyl fluoride polymer and then can be converted to the sulfonic acid form.

In one embodiment, the fluorinated acid polymer is homopolymer or copolymer of a fluorinated and partially sulfonated poly(arylene ether sulfone). The copolymer can be a block copolymer. Examples of comonomers include, but are not limited to butadiene, butylene, isobutylene, styrene, and combinations thereof.

In one embodiment, the fluorinated acid polymer is a homopolymer or copolymer of monomers having Formula VII:

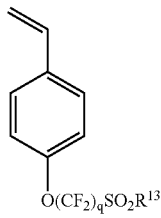

(VII)

where:
q is an integer from 1 to 5,
$R^{13}$ is OH or $NHR^{14}$, and
$R^{14}$ is alkyl, fluoroalkyl, sulfonylalkyl, or sulfonylfluoroalkyl.

In one embodiment, the monomer is "SFS" or SFSI" shown below:

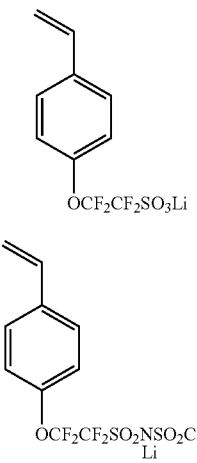

SFS

SFSI

After polymerization, the polymer can be converted to the acid form.

In one embodiment, the fluorinated acid polymer is a homopolymer or copolymer of a trifluorostyrene having acidic groups. In one embodiment, the trifluorostyrene monomer has Formula VIII:

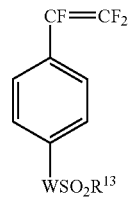

(VIII)

where:
W is selected from $(CF_2)_q$, $O(CF_2)_q$, $S(CF_2)_q$, $(CF_2)_qO(CF_2)_r$, and $SO_2(CF_2)_q$,
q and r are independently an integer from 1 to 5,
$R^{13}$ is OH or $NHR^{14}$, and
$R^{14}$ is alkyl, fluoroalkyl, sulfonylalkyl, or sulfonylfluoroalkyl.

In one embodiment, the monomer containing W equal to $S(CF_2)_q$ is polymerized then oxidized to give the polymer containing W equal to $SO_2(CF_2)_q$. In one embodiment, the polymer containing $R^{13}$ equal to F is converted its acid form where $R^{13}$ is equal to OH or $NHR^{14}$.

In one embodiment, the fluorinated acid polymer is a sulfonimide polymer having Formula IX:

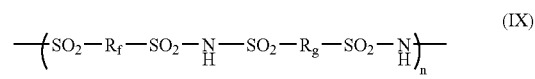

(IX)

where:
$R_f$ is selected from fluorinated alkylene, fluorinated heteroalkylene, fluorinated arylene, or fluorinated heteroarylene;
$R_g$ is selected from fluorinated alkylene, fluorinated heteroalkylene, fluorinated arylene, fluorinated heteroarylene, arylene, or heteroarylene; and
n is at least 4.

In one embodiment of Formula IX, $R_f$ and $R_g$ are perfluoroalkylene groups. In one embodiment, $R_f$ and $R_g$ are perfluorobutylene groups. In one embodiment, $R_f$ and $R_g$ contain ether oxygens. In one embodiment, n is greater than 20.

In one embodiment, the water-soluble fluorinated acid polymer comprises a fluorinated polymer backbone including a side chain having Formula X:

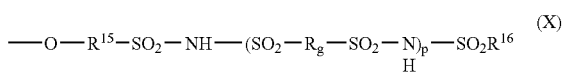

(X)

where:
$R_g$ is selected from fluorinated alkylene, fluorinated heteroalkylene, fluorinated arylene, fluorinated heteroarylene, arylene, or heteroarylene;
$R^{15}$ is a fluorinated alkylene group or a fluorinated heteroalkylene group;
$R^{16}$ is a fluorinated alkyl or a fluorinated aryl group; and
p is 0 or an integer from 1 to 4.

In one embodiment, the organic-solvent wettable fluorinated acid polymer has Formula XI:

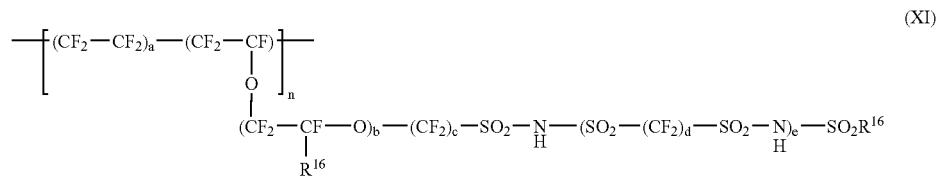

(XI)

where:

$R^{16}$ is a fluorinated alkyl or a fluorinated aryl group;

a, b, c, d, and e are each independently 0 or an integer from 1 to 4; and n is at least 4.

The synthesis of fluorinated acid polymers has been described in, for example, A. Feiring et al., J. Fluorine Chemistry 2000, 105, 129-135; A. Feiring et al., Macromolecules 2000, 33, 9262-9271; D. D. Desmarteau, J. Fluorine Chem. 1995, 72, 203-208; A. J. Appleby et al., J. Electrochem. Soc. 1993, 140(1), 109-111; and Desmarteau, U.S. Pat. No. 5,463,005.

In one embodiment, the wettable organic solvent wettable fluorinated acid polymer comprises at least one repeat unit derived from an ethylenically unsaturated compound having Formula (XII):

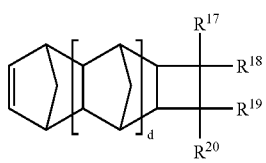

(XII)

wherein d is 0, 1, or 2;

$R^{17}$ to $R^{20}$ are independently H, halogen, alkyl or alkoxy of 1 to 10 carbon atoms, Y, $C(R_f')(R_f')OR^{21}$, $R^4Y$ or $OR^4Y$;

Y is $COE^2$, $SO_2E^2$, or sulfonimide;

$R^{21}$ is hydrogen or an acid-labile protecting group;

$R_f'$ is the same or different at each occurrence and is a fluoroalkyl group of 1 to 10 carbon atoms, or taken together are $(CF_2)_e$ where e is 2 to 10;

$R^4$ is an alkylene group;

$E^2$ is OH, halogen, or $OR^7$; and $R^5$ is an alkyl group;

with the proviso that at least one of $R^{17}$ to $R^{20}$ is Y, $R^4Y$ or $OR^4Y$.

$R^4$, $R^5$, and $R^{17}$ to $R^{20}$ may optionally be substituted by halogen or ether oxygen.

Some illustrative, but nonlimiting, examples of representative monomers of Formula XII are presented below as Formulas XIIa-XIIe:

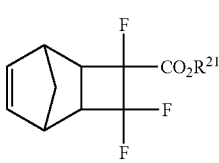

(XIIa)

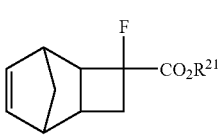

(XIIb)

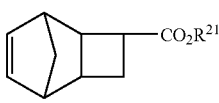

(XIIc)

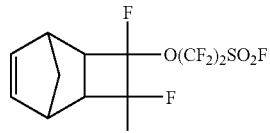

(XIId)

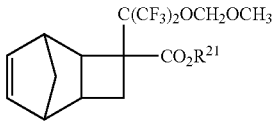

(XIIe)

wherein $R^{21}$ is a group capable of forming or rearranging to a tertiary cation, more typically an alkyl group of 1 to 20 carbon atoms, and most typically t-butyl.

Compounds of Formula XII wherein d=0, (e.g., Formula XII-a), may be prepared by cycloaddition reaction of unsaturated compounds of structure (XIII) with quadricyclane (tetracyclo[2.2.1.0$^{2,6}$0$^{3,5}$]heptane) as shown in the equation below.

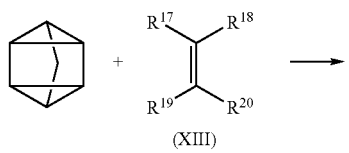

The reaction may be conducted at temperatures ranging from about 0° C. to about 200° C., more typically from about 30° C. to about 150° C. in the absence or presence of an inert solvent such as diethyl ether. For reactions conducted at or above the boiling point of one or more of the reagents or solvent, a closed reactor is typically used to avoid loss of volatile components. Compounds of structure (XII) with higher values of d (i.e., d=1 or 2) may be prepared by reaction of compounds of structure (XII) with d=0 with cyclopentadiene, as is known in the art.

In one embodiment, the organic solvent wettable fluorinated acid polymer is a copolymer which also comprises a repeat unit derived from at least one fluoroolefin, which is an ethylenically unsaturated compound containing at least one fluorine atom attached to an ethylenically unsaturated carbon. The fluoroolefin comprises 2 to 20 carbon atoms. Representative fluoroolefins include, but are not limited to, tetrafluoroethylene, hexafluoropropylene, chlorotrifluoroethylene, vinylidene fluoride, vinyl fluoride, perfluoro-(2,2-dimethyl-1,3-dioxole), perfluoro-(2-methylene-4-methyl-1,3-dioxolane), $CF_2=CFO(CF_2)_tCF=CF_2$, where t is 1 or 2, and $R_f''OCF=CF_2$ wherein $R_f''$ is a saturated fluoroalkyl group of from 1 to about ten carbon atoms. In one embodiment, the comonomer is tetrafluoroethylene.

In one embodiment, the organic solvent wettable fluorinated acid polymer is water soluble. In one embodiment, the acid forms a colloidal dispersion in water. In one embodiment, the acid is dispersible in water to form a homogeneous composition.

The new electrically conductive polymer composition is prepared by polymerizing the precursor monomer in the presence of the organic solvent wettable fluorinated acid polymer. In one embodiment, the precursor monomer is polymerized oxidatively.

The polymerization is generally carried out in a homogeneous aqeuous solution. In another embodiment, the polymerization for obtaining the electrically conducting polymer is carried out in an emulsion of water and an organic solvent. In general, some water is present in order to obtain adequate solubility of the oxidizing agent and/or catalyst. Oxidizing agents such as ammonium persulfate, sodium persulfate, potassium persulfate, and the like, can be used. A catalyst, such as ferric chloride, or ferric sulfate may also be present. The resulting polymerized product will be a solution, dispersion, or emulsion of the doped conductive polymer.

In one embodiment, the method of making an aqueous dispersion of the new conductive polymer composition includes forming a reaction mixture by combining water, at least one precursor monomer, at least one organic solvent wettable fluorinated acid polymer, and an oxidizing agent, in any order, provided that at least a portion of the organic solvent wettable fluorinated acid polymer is present when at least one of the precursor monomer and the oxidizing agent is added. It will be understood that, in the case of electrically conductive copolymers, the term "at least one precursor monomer" encompasses more than one type of monomer.

In one embodiment, the method of making the new conductive polymer composition comprises:
 (a) providing an aqueous solution or dispersion of an organic solvent wettable fluorinated acid polymer;
 (b) adding an oxidizer to the solution or dispersion of step (a); and
 (c) adding at least one precursor monomer to the mixture of step (b).

In another embodiment, the precursor monomer is added to the aqueous solution or dispersion of the organic solvent wettable fluorinated acid polymer prior to adding the oxidizer. Step (b) above, which is adding oxidizing agent, is then carried out.

In another embodiment, a mixture of water and the precursor monomer is formed, in a concentration typically in the range of about 0.5% by weight to about 4.0% by weight precursor monomer. This precursor monomer mixture is added to the aqueous solution or dispersion of the organic solvent wettable fluorinated acid polymer, and step (b) above, which is adding oxidizing agent, is carried out.

In another embodiment, the aqueous polymerization mixture may include a polymerization catalyst, such as ferric sulfate, ferric chloride, and the like. The catalyst is added before the last step. In another embodiment, a catalyst is added together with an oxidizing agent.

In one embodiment, the polymerization is carried out in the presence of co-dispersing liquids which are miscible with water. Examples of suitable co-dispersing liquids include, but are not limited to ethers, alcohols, alcohol ethers, cyclic ethers, ketones, nitriles, sulfoxides, amides, and combinations thereof. In one embodiment, the co-dispersing liquid is an alcohol. In one embodiment, the co-dispersing liquid is an organic solvent selected from n-propanol, isopropanol, t-butanol, dimethylacetamide, dimethylformamide, N-methylpyrrolidone, and mixtures thereof. In general, the amount of co-dispersing liquid should be less than about 60% by volume. In one embodiment, the amount of co-dispersing liquid is less than about 30% by volume. In one embodiment, the amount of co-dispersing liquid is between 5 and 50% by volume. The use of a co-dispersing liquid in the polymerization significantly reduces particle size and improves filterability of the dispersions. In addition, buffer materials obtained by this process show an increased viscosity and films prepared from these dispersions are of high quality.

The co-dispersing liquid can be added to the reaction mixture at any point in the process.

In one embodiment, the polymerization is carried out in the presence of a co-acid which is a Brønsted acid. The acid can be an inorganic acid, such as HCl, sulfuric acid, and the like, or an organic acid, such as acetic acid or p-toluenesulfonic acid. Alternatively, the acid can be a water soluble polymeric acid such as poly(styrenesulfonic acid), poly(2-acrylamido-2-methyl-1-propanesulfonic acid, or the like, or a second organic solvent wettable fluorinated acid polymer, as described above. Combinations of acids can be used.

The co-acid can be added to the reaction mixture at any point in the process prior to the addition of either the oxidizer or the precursor monomer, whichever is added last. In one embodiment, the co-acid is added before both the precursor monomer and the organic solvent wettable fluorinated acid polymer, and the oxidizer is added last. In one embodiment the co-acid is added prior to the addition of the precursor monomer, followed by the addition of the organic solvent wettable fluorinated acid polymer, and the oxidizer is added last.

In one embodiment, the polymerization is carried out in the presence of both a co-dispersing liquid and a co-acid.

In the method of making the new conductive polymer composition, the molar ratio of oxidizer to precursor monomer is generally in the range of 0.1 to 3.0; and in one embodiment is 0.4 to 1.5. The molar ratio of organic solvent wettable fluorinated acid polymer to precursor monomer is generally in the range of 0.2 to 10. In one embodiment, the ratio is in the range of 1 to 5. The overall solid content is generally in the range of about 0.5% to 12% in weight percentage; and in one embodiment of about 2% to 6%. The reaction temperature is generally in the range of about 4° C. to 50° C.; in one embodiment about 20° C. to 35° C. The molar ratio of optional co-acid to precursor monomer is about 0.05 to 4. The addition time of the oxidizer influences particle size and viscosity. Thus, the particle size can be reduced by slowing down the addition speed. In parallel, the viscosity is increased by slowing down the addition speed. The reaction time is generally in the range of about 1 to about 30 hours.

As synthesized, the aqueous dispersions of the new conductive polymer composition generally have a very low pH. It has been found that the pH can be adjusted to higher values, without adversely affecting the properties in devices. In one embodiment, the pH of the dispersion can be adjusted to about 1.5 to about 5. In one embodiment, the pH is adjusted to between 3 and 4. It has been found that the pH can be adjusted using known techniques, for example, ion exchange or by titration with an aqueous basic solution.

In one embodiment, after completion of the polymerization reaction, the as-synthesized aqueous dispersion is contacted with at least one ion exchange resin under conditions suitable to remove decomposed species, side reaction products, and unreacted monomers, and to adjust pH, thus producing a stable, aqueous dispersion with a desired pH. In one embodiment, the as-synthesized aqueous dispersion is contacted with a first ion exchange resin and a second ion exchange resin, in any order. The as-synthesized aqueous dispersion can be treated with both the first and second ion exchange resins simultaneously, or it can be treated sequentially with one and then the other.

Ion exchange is a reversible chemical reaction wherein an ion in a fluid medium (such as an aqueous dispersion) is exchanged for a similarly charged ion attached to an immobile solid particle that is insoluble in the fluid medium. The term "ion exchange resin" is used herein to refer to all such substances. The resin is rendered insoluble due to the crosslinked nature of the polymeric support to which the ion exchanging groups are attached. Ion exchange resins are classified as cation exchangers or anion exchangers. Cation exchangers have positively charged mobile ions available for exchange, typically protons or metal ions such as sodium ions. Anion exchangers have exchangeable ions which are negatively charged, typically hydroxide ions.

In one embodiment, the first ion exchange resin is a cation, acid exchange resin which can be in protonic or metal ion, typically sodium ion, form. The second ion exchange resin is a basic, anion exchange resin. Both acidic, cation including proton exchange resins and basic, anion exchange resins are contemplated for use in the practice of the invention. In one embodiment, the acidic, cation exchange resin is an inorganic acid, cation exchange resin, such as a sulfonic acid cation exchange resin. Sulfonic acid cation exchange resins contemplated for use in the practice of the invention include, for example, sulfonated styrene-divinylbenzene copolymers, sulfonated crosslinked styrene polymers, phenol-formaldehyde-sulfonic acid resins, benzene-formaldehyde-sulfonic acid resins, and mixtures thereof. In another embodiment, the acidic, cation exchange resin is an organic acid, cation exchange resin, such as carboxylic acid, acrylic or phosphorous cation exchange resin. In addition, mixtures of different cation exchange resins can be used.

In another embodiment, the basic, anionic exchange resin is a tertiary amine anion exchange resin. Tertiary amine anion exchange resins contemplated for use in the practice of the invention include, for example, tertiary-aminated styrene-divinylbenzene copolymers, tertiary-aminated crosslinked styrene polymers, tertiary-aminated phenol-formaldehyde resins, tertiary-aminated benzene-formaldehyde resins, and mixtures thereof. In a further embodiment, the basic, anionic exchange resin is a quaternary amine anion exchange resin, or mixtures of these and other exchange resins.

The first and second ion exchange resins may contact the as-synthesized aqueous dispersion either simultaneously, or consecutively. For example, in one embodiment both resins are added simultaneously to an as-synthesized aqueous dispersion of an electrically conducting polymer, and allowed to remain in contact with the dispersion for at least about 1 hour, e.g., about 2 hours to about 20 hours. The ion exchange resins can then be removed from the dispersion by filtration. The size of the filter is chosen so that the relatively large ion exchange resin particles will be removed while the smaller dispersion particles will pass through. Without wishing to be bound by theory, it is believed that the ion exchange resins quench polymerization and effectively remove ionic and non-ionic impurities and most of unreacted monomer from the as-synthesized aqueous dispersion. Moreover, the basic, anion exchange and/or acidic, cation exchange resins renders the acidic sites more basic, resulting in increased pH of the dispersion. In general, about one to five grams of ion exchange resin is used per gram of new conductive polymer composition.

In many cases, the basic ion exchange resin can be used to adjust the pH to the desired level. In some cases, the pH can be further adjusted with an aqueous basic solution such as a solution of sodium hydroxide, ammonium hydroxide, tetramethylammonium hydroxide, or the like.

In one embodiment, a reaction vessel is charged first with a mixture of water, alcohol co-dispersing agent, and inorganic co-acid. To this is added, in order, a precursor monomer, and an aqueous solution or dispersion of organic solvent wettable fluorinated acid polymer, and an oxidizer. The oxidizer is added slowly and dropwise to prevent the formation of localized areas of high ion concentration which can destabilize the mixture. The mixture is stirred and the reaction is then allowed to proceed at a controlled temperature. When polymerization is completed, the reaction mixture is treated with a strong acid cation resin, stirred and filtered; and then treated with a base anion exchange resin, stirred and filtered. Alternative orders of addition can be used, as discussed above.

In another embodiment, more conductive dispersions are formed by the addition of highly conductive additives to the aqueous dispersions of the new conductive polymer composition. Because dispersions with relatively high pH can be formed, the conductive additives, especially metal additives, are not attacked by the acid in the dispersion. Examples of suitable conductive additives include, but are not limited to metal particles and nanoparticles, nanowires, carbon nanotubes, graphite fibers or particles, carbon particles, and combinations thereof.

In another embodiment of the invention, there are provided buffer layers deposited from aqueous dispersions comprising the new conductive polymer composition. The term "layer" is used interchangeably with the term "film" and refers to a coating covering a desired area. The term is not limited by size. The area can be as large as an entire device or as small as a specific functional area such as the actual visual display, or as small as a single sub-pixel. Layers and films can be formed by any conventional deposition technique, including vapor deposition, liquid deposition (continuous and discontinuous techniques), and thermal transfer. Continuous deposition techniques, include but are not limited to, spin coating, gravure coating, curtain coating, dip coating, slot-die coating, spray coating, and continuous nozzle coating. Discontinuous deposition techniques include, but are not limited to, ink jet printing, gravure printing, and screen printing.

In some embodiments, the dried films of the new conductive polymer composition are not redispersible in water. Thus the buffer layer can be applied as multiple thin layers. In addition, the buffer layer can be overcoated with a layer of different water-soluble or water-dispersible material without being damaged. Buffer layers comprising the new conductive polymer composition have been surprisingly found to have improved wettability.

In another embodiment, there are provided buffer layers deposited from aqueous dispersions comprising the new conductive polymer composition blended with other water soluble or dispersible materials. Examples of types of materials which can be added include, but are not limited to polymers, dyes, coating aids, organic and inorganic conductive inks and pastes, charge transport materials, crosslinking agents, and combinations thereof. The other water soluble or dispersible materials can be simple molecules or polymers. Examples of suitable polymers include, but are not limited to, conductive polymers such as polythiophenes, polyanilines, polypyrroles, polyacetylenes, and combinations thereof.

In another embodiment of the invention, there are provided electronic devices comprising at least one electroactive layer positioned between two electrical contact layers, wherein the device further includes the new buffer layer. The term "electroactive" when referring to a layer or material is intended to mean a layer or material that exhibits electronic or electroradiative properties. An electroactive layer material may emit radiation or exhibit a change in concentration of electron-hole pairs when receiving radiation.

Figure 2:
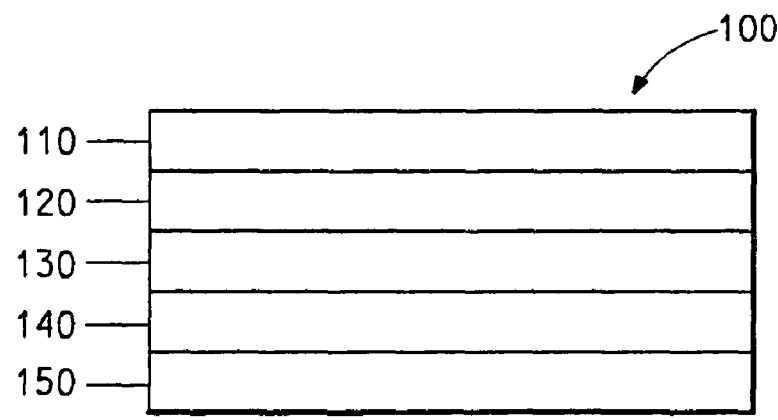
FIG. 2 is a schematic diagram of an organic electronic device.

As shown in FIG. 2, a typical device, 100, has an anode layer 110, a buffer layer 120, an electroactive layer 130, and a cathode layer 150. Adjacent to the cathode layer 150 is an optional electron-injection/transport layer 140.

The device may include a support or substrate (not shown) that can be adjacent to the anode layer 110 or the cathode layer 150. Most frequently, the support is adjacent the anode layer 110. The support can be flexible or rigid, organic or inorganic. Examples of support materials include, but are not limited to, glass, ceramic, metal, and plastic films.

The anode layer 110 is an electrode that is more efficient for injecting holes compared to the cathode layer 150. The anode can include materials containing a metal, mixed metal, alloy, metal oxide or mixed oxide. Suitable materials include the mixed oxides of the Group 2 elements (i.e., Be, Mg, Ca, Sr, Ba, Ra), the Group 11 elements, the elements in Groups 4, 5, and 6, and the Group 8-10 transition elements. If the anode layer 110 is to be light transmitting, mixed oxides of Groups 12, 13 and 14 elements, such as indium-tin-oxide, may be used. As used herein, the phrase "mixed oxide" refers to oxides having two or more different cations selected from the Group 2 elements or the Groups 12, 13, or 14 elements. Some non-limiting, specific examples of materials for anode layer 110 include, but are not limited to, indium-tin-oxide ("ITO"), indium-zinc-oxide, aluminum-tin-oxide, gold, silver, copper, and nickel. The anode may also comprise an organic material, especially a conducting polymer such as polyaniline, including exemplary materials as described in "Flexible light-emitting diodes made from soluble conducting polymer," Nature vol. 357, pp 477 479 (11 Jun. 1992). At least one of the anode and cathode should be at least partially transparent to allow the generated light to be observed.

The anode layer 110 may be formed by a chemical or physical vapor deposition process or spin-cast process. Chemical vapor deposition may be performed as a plasma-enhanced chemical vapor deposition ("PECVD") or metal organic chemical vapor deposition ("MOCVD"). Physical vapor deposition can include all forms of sputtering, including ion beam sputtering, as well as e-beam evaporation and resistance evaporation. Specific forms of physical vapor deposition include rf magnetron sputtering and inductively-coupled plasma physical vapor deposition ("IMP-PVD"). These deposition techniques are well known within the semiconductor fabrication arts.

In one embodiment, the anode layer 110 is patterned during a lithographic operation. The pattern may vary as desired. The layers can be formed in a pattern by, for example, positioning a patterned mask or resist on the first flexible composite barrier structure prior to applying the first electrical contact layer material. Alternatively, the layers can be applied as an overall layer (also called blanket deposit) and subsequently patterned using, for example, a patterned resist layer and wet chemical or dry etching techniques. Other processes for patterning that are well known in the art can also be used.

The buffer layer 120 is usually deposited onto substrates using a variety of techniques well-known to those skilled in the art. Typical deposition techniques, as discussed above, include liquid deposition (continuous and discontinuous techniques), and thermal transfer.

An optional layer, not shown, may be present between the buffer layer 120 and the electroactive layer 130. This layer may comprise hole transport materials. Examples of hole transport materials for this optional layer have been summarized for example, in Kirk-Othmer Encyclopedia of Chemical Technology, Fourth Edition, Vol. 18, p. 837-860, 1996, by Y. Wang. Both hole transporting molecules and polymers can be used. Commonly used hole transporting molecules include, but are not limited to: 4,4',4"-tris(N,N-diphenyl-amino)-triphenylamine (TDATA); 4,4',4"-tris(N-3-methylphenyl-N-phenyl-amino)-triphenylamine (MTDATA); N,N'-diphenyl-N,N'-bis(3-methylphenyl)-[1,1'-biphenyl]-4,4'-diamine (TPD); 1,1-bis[(di-4-tolylamino)phenyl]cyclohexane (TAPC); N,N'-bis(4-methylphenyl)-N,N'-bis(4-ethylphenyl)-[1,1'-(3,3'-dimethyl)biphenyl]-4,4'-diamine (ETPD); tetrakis-(3-methylphenyl)-N,N,N',N'-2,5-phenylenediamine (PDA); α-phenyl-4-N,N-diphenylaminostyrene (TPS); p-(diethylamino)benzaldehyde diphenylhydrazone (DEH); triphenylamine (TPA); bis[4-(N,N-diethylamino)-2-methylphenyl](4-methylphenyl)methane (MPMP); 1-phenyl-3-[p-(diethylamino)styryl]-5-[p-(diethylamino)phenyl] pyrazoline (PPR or DEASP); 1,2-trans-bis(9H-carbazol-9-yl)cyclobutane (DCZB); N,N,N',N'-tetrakis(4-methylphenyl)-(1,1'-biphenyl)-4,4'-diamine (TTB); N,N'-bis(naphthalen-1-yl)-N,N'-bis-(phenyl)benzidine (α-NPB); and porphyrinic compounds, such as copper phthalocyanine. Commonly used hole transporting polymers include, but are not limited to, poly(9,9,-dioctyl-fluorene-co-N-(4-butylphenyl)diphenylamine), and the like, polyvinylcarbazole, (phenylmethyl) polysilane, poly(dioxythiophenes), polyanilines, and polypyrroles. It is also possible to obtain hole transporting polymers by doping hole transporting molecules such as those mentioned above into polymers such as polystyrene and polycarbonate.

Depending upon the application of the device, the electroactive layer 130 can be a light-emitting layer that is activated by an applied voltage (such as in a light-emitting diode or light-emitting electrochemical cell), a layer of material that responds to radiant energy and generates a signal with or without an applied bias voltage (such as in a photodetector). In one embodiment, the electroactive material is an organic electroluminescent ("EL") material, Any EL material can be used in the devices, including, but not limited to, small molecule organic fluorescent compounds, fluorescent and phosphorescent metal complexes, conjugated polymers, and mixtures thereof. Examples of fluorescent compounds include, but are not limited to, pyrene, perylene, rubrene, coumarin, derivatives thereof, and mixtures thereof. Examples of metal complexes include, but are not limited to, metal chelated oxinoid compounds, such as tris(8-hydroxyquinolato)aluminum (Alq3); cyclometalated iridium and platinum electroluminescent compounds, such as complexes of iridium with phenylpyridine, phenylquinoline, or phenylpyrimidine ligands as disclosed in Petrov et al., U.S. Pat. No. 6,670,645 and Published PCT Applications WO 03/063555 and WO 2004/016710, and organometallic complexes described in, for example, Published PCT Applications WO 03/008424, WO 03/091688, and WO 03/040257, and mixtures thereof. Electroluminescent emissive layers comprising a charge carrying host material and a metal complex have been described by Thompson et al., in U.S. Pat. No. 6,303,238, and by Burrows and Thompson in published PCT applications WO 00/70655 and WO 01/41512. Examples of conjugated polymers include, but are not limited to poly(phenylenevinylenes), polyfluorenes, poly(spirobifluorenes), polythiophenes, poly(p-phenylenes), copolymers thereof, and mixtures thereof.

Optional layer 140 can function both to facilitate electron injection/transport, and can also serve as a confinement layer to prevent quenching reactions at layer interfaces. More specifically, layer 140 may promote electron mobility and reduce the likelihood of a quenching reaction if layers 130 and 150 would otherwise be in direct contact. Examples of materials for optional layer 140 include, but are not limited to, metal chelated oxinoid compounds, such as bis(2-methyl-8-quinolinolato)(para-phenyl-phenolato)aluminum(III) (BAlQ), tetra(8-hydroxyquinolato)zirconium (ZrQ), and tris(8-hydroxyquinolato)aluminum ($Alq_3$); azole compounds such as 2-(4-biphenylyl)-5-(4-t-butylphenyl)-1,3,4-oxadiazole (PBD), 3-(4-biphenylyl)4-phenyl-5-(4-t-butylphenyl)-1,2,4-triazole (TAZ), and 1,3,5-tri(phenyl-2-benzimidazole)benzene (TPBI); quinoxaline derivatives such as 2,3-bis(4-fluorophenyl)quinoxaline; phenanthroline derivatives such as 9,10-diphenylphenanthroline (DPA) and 2,9-dimethyl4,7-diphenyl-1,10-phenanthroline (DDPA); and any one or more combinations thereof. Alternatively, optional layer 140 may be inorganic and comprise BaO, LiF, $Li_2O$, or the like.

The cathode layer 150 is an electrode that is particularly efficient for injecting electrons or negative charge carriers. The cathode layer 150 can be any metal or nonmetal having a lower work function than the first electrical contact layer (in this case, the anode layer 110). As used herein, the term "lower work function" is intended to mean a material having a work function no greater than about 4.4 eV. As used herein, "higher work function" is intended to mean a material having a work function of at least approximately 4.4 eV.

Materials for the cathode layer can be selected from alkali metals of Group 1 (e.g., Li, Na, K, Rb, Cs,), the Group 2 metals (e.g., Mg, Ca, Ba, or the like), the Group 12 metals, the lanthanides (e.g., Ce, Sm, Eu, or the like), and the actinides (e.g., Th, U, or the like). Materials such as aluminum, indium, yttrium, and combinations thereof, may also be used. Specific non-limiting examples of materials for the cathode layer 150 include, but are not limited to, barium, lithium, cerium, cesium, europium, rubidium, yttrium, magnesium, samarium, and alloys and combinations thereof.

The cathode layer 150 is usually formed by a chemical or physical vapor deposition process. In some embodiments, the cathode layer will be patterned, as discussed above in reference to the anode layer 110.

Other layers in the device can be made of any materials which are known to be useful in such layers upon consideration of the function to be served by such layers.

In some embodiments, an encapsulation layer (not shown) is deposited over the contact layer 150 to prevent entry of undesirable components, such as water and oxygen, into the device 100. Such components can have a deleterious effect on the organic layer 130. In one embodiment, the encapsulation layer is a barrier layer or film. In one embodiment, the encapsulation layer is a glass lid.

Though not depicted, it is understood that the device 100 may comprise additional layers. Other layers that are known in the art or otherwise may be used. In addition, any of the above-described layers may comprise two or more sub-layers or may form a laminar structure. Alternatively, some or all of anode layer 110 the buffer layer 120, the electron transport layer 140, cathode layer 150, and other layers may be treated, especially surface treated, to increase charge carrier transport efficiency or other physical properties of the devices. The choice of materials for each of the component layers is preferably determined by balancing the goals of providing a device with high device efficiency with device operational lifetime considerations, fabrication time and complexity factors and other considerations appreciated by persons skilled in the art. It will be appreciated that determining optimal components, component configurations, and compositional identities would be routine to those of ordinary skill of in the art.

In various embodiments, the different layers have the following ranges of thicknesses: anode 110, 500-5000 Å, in one embodiment 1000-2000 Å; buffer layer 120, 50-2000 Å, in one embodiment 200-1000 Å; optional hole transport layer, 50 -2000 Å, in one embodiment 100-1000 Å; photoactive layer 130, 10-2000 Å, in one embodiment 100-1000 Å; optional electron transport layer 140, 50-2000 Å, in one embodiment 100-1000 Å; cathode 150, 200-10000 Å, in one embodiment 300-5000 Å. The location of the electron-hole recombination zone in the device, and thus the emission spectrum of the device, can be affected by the relative thickness of each layer. Thus the thickness of the electron-transport layer should be chosen so that the electron-hole recombination zone is in the light-emitting layer. The desired ratio of layer thicknesses will depend on the exact nature of the materials used.

In operation, a voltage from an appropriate power supply (not depicted) is applied to the device 100. Current therefore passes across the layers of the device 100. Electrons enter the organic polymer layer, releasing photons. In some OLEDs, called active matrix OLED displays, individual deposits of photoactive organic films may be independently excited by the passage of current, leading to individual pixels of light emission. In some OLEDs, called passive matrix OLED displays, deposits of photoactive organic films may be excited by rows and columns of electrical contact layers.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Also, use of "a" or "an" are employed to describe elements and components of the invention. This is done merely for convenience and to give a general sense of the invention. This description should be read to include one or at least one and the singular also includes the plural unless it is obvious that it is meant otherwise.

The term "hole transport" when referring to a layer, material, member, or structure, is intended to mean such layer, material, member, or structure facilitates migration of positive charges through the thickness of such layer, material, member, or structure with relative efficiency and small loss of charge.

The term "electron transport" means when referring to a layer, material, member or structure, such a layer, material, member or structure that promotes or facilitates migration of negative charges through such a layer, material, member or structure into another layer, material, member or structure.

The term "organic electronic device" is intended to mean a device including one or more semiconductor layers or materials. Organic electronic devices include, but are not limited to: (1) devices that convert electrical energy into radiation (e.g., a light-emitting diode, light emitting diode display, diode laser, or lighting panel), (2) devices that detect signals through electronic processes (e.g., photodetectors photoconductive cells, photoresistors, photoswitches, phototransistors, phototubes, infrared ("IR") detectors, or biosensors), (3) devices that convert radiation into electrical energy (e.g., a photovoltaic device or solar cell), and (4) devices that include one or more electronic components that include one or more organic semiconductor layers (e.g., a transistor or diode).

Unless otherwise defined, all technical and scientific terms used herein have the same meaning as commonly understood by one of ordinary skill in the art to which this invention belongs. In the Formulae, the letters Q, R, T, W, Y, and Z are used to designate atoms or groups which are defined within. All other letters are used to designate conventional atomic symbols. Group numbers corresponding to columns within the Periodic Table of the elements use the "New Notation" convention as seen in the CRC Handbook of Chemistry and Physics, 81$^{st}$ Edition (2000).

Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

EXAMPLES

Example 1

This example illustrates the preparation of an organic solvent wettable sulfonic acid polymer to be used in the preparation of a new conductive polymer composition. The polymer is a copolymer of 1,1-difluoroethylene ("VF$_2$") and 2-(1,1-difluoro-2-(trifluoromethyl)allyloxy)-1,1,2,2-tetrafluoroethanesulfonyl fluoride ("PSEBVE"), which has been converted to the sulfonic acid form. The resulting polymer is referred to as "VF$_2$-PSEBVE".

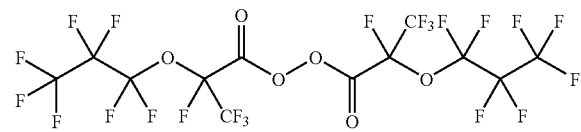

HFPO-dimer peroxide

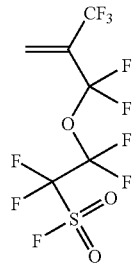

2-(1,1-difluoro-2-(trifluoromethyl)allyloxy)-
1,1,2,2-tetrafluoroethanesulfonyl fluoride
(PSEBVE)

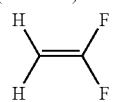

1,1-difluoroethylene
(VF2)

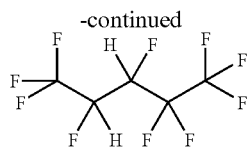

Vertrel(R) XF

A 400 mL Hastelloy C276 reaction vessel was charged with 160 mL of Vertrel® XF, 4 mL of a 20 wt. % solution of HFPO dimer peroxide in Vertrel® XF, and 143 g of PSEBVE (0.42 mol). The vessel was cooled to −35° C., evacuated to −3 PSIG, and purged with nitrogen. The evacuate/purge cycle was repeated two more times. To the vessel was then added 29 g VF$_2$ (0.45 mol). The vessel was heated to 28° C., which increased the pressure to 92 PSIG. The reaction temperature was maintained at 28° C. for 18 h. at which time the pressure had dropped to 32 PSIG. The vessel was vented and the crude liquid material was recovered. The Vertrel® XF was removed in vacuo to afford 110 g of desired copolymer.

Conversion of the sulfonyl fluoride copolymer prepared above to sulfonic acid was carried out in the following manner. 20 g of dried polymer and 5.0 g lithium carbonate were refluxed in 100 mL dry methanol for 12 h. The mixture was brought to room temperature and filtered to remove any remaining solids. The methanol was removed in vacuo to isolate the lithium salt of the polymer. The lithium salt of the polymer was then dissolved in water and added with Amberlyst 15, a protonic acid exchange resin which had been washed thoroughly with water until there was no color in the water. The mixture was stirred and filtered. Filtrate was added with fresh Amberlyst 15 resin and filtered again. The step was repeated two more times. Water was then removed from the final filtrates and the solids were then dried in a vacuum oven.

Films made from VF$_2$-PSEBVE acid are wettable by organic solvents. Phenylhexane will have a contact angle less than 40° on the films.

Example 2

This example illustrates the preparation of an organic solvent wettable sulfonic acid polymer to be used in the preparation of a new conductive polymer composition. The polymer is a copolymer of ethylene ("E") and 2-(2-(1,2,2-trifluorovinyloxy)-1,1,2,3,3,3-hexafluoropropoxy)-1,1,2,2-tetrafluoroethanesulfonyl fluoride ("PSEPVE"), which has been converted to the sulfonic acid form. The resulting polymer is referred to as "E-PSEPVE acid".

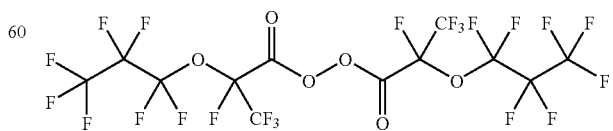

HFPO-dimer peroxide

-continued

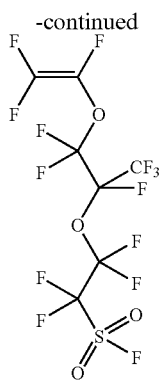

2-(2-(1,2,2-trifluorovinyloxy)-1,1,2,3,3,3-hexafluoropropoxy)-
1,1,2,2-tetrafluoroethanesulfonyl fluoride
or
Perfluoro-2-(2-fluorosulfonylethoxy)propylvinylether, (PSEPVE)

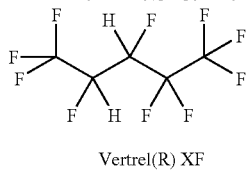

Vertrel(R) XF

A 210 mL Hastelloy C276 reaction vessel was charged with 60 g of PSEPVE (0.13 mol) and 1 mL of a 0.17 M solution of HFPO dimer peroxide in Vertrel® XF. The vessel was cooled to −35° C., evacuated to −3 PSIG, and purged with nitrogen. The evacuate/purge cycle was repeated two more times. To the vessel was then added 20 g ethylene (0.71 mol) and an additional 900 PSIG of nitrogen gas. The vessel was heated to 24° C., which increased the pressure to 1400 PSIG. The reaction temperature was maintained at 24° C. for 18 h. at which time the pressure had dropped to 1350 PSIG. The vessel was vented and 61.4 g of crude material was recovered. 10 g of this material were dried at 85° C. and 20 milliTorr for 10 h. to give 8.7 g of dried polymer.

Conversion of the sulfonyl fluoride copolymer prepared above to sulfonic acid was carried out in the following manner. A mixture of 19.6 g of dried polymer and 5.6 g lithium carbonate were refluxed in 300 mL dry methanol for 6 h. The mixture was brought to room temperature and filtered to remove any remaining solids. The methanol was removed in vacuo to afford 15.7 g of the lithium salt of the polymer. The lithium salt of the polymer was then dissolved in water and added with Amberlyst 15, a protonic acid exchange resin which had been washed thoroughly with water until there was no color in the water. The mixture was stirred and filtered. Filtrate was added with fresh Amberlyst 15 resin and filtered again. The step was repeated two more times. Water was then removed from the final filtrates and the solids were then dried in a vacuum oven.

Films made from E-PSEPVE acid are wettable by organic solvents. Phenylhexane will have a contact angle less than 40° on the films.

Example 3

This example illustrates the preparation of a conductive polymer composition by the oxidative polymerization of a precursor monomer in the presence of an organic solvent wettable fluorinated acid polymer. The precursor monomer was 3,4-ethylenedioxythiophene. The organic solvent wettable fluorinated acid polymer was E-PSEPVE acid from Example 2.

54.09 g aqueous solution of 2.09% E-PSEPVE acid made in Example 2 and 55.22 g deionized water were poured into a 250mL Erlenenmeyer flask. The mixture was stirred with a magnetic stirrer for 10 minutes. 0.0886 mL (0.831 mmoles) of Baytron-M (a trade name for 3,4-ethylenedioxythiophene from H. C. Starck, Massachusetts, USA) was added to the reaction solution with stirring. The mixture was stirred for 30 minutes while a stock solution of ferric sulfate was being made. 0.0086 g ferric sulfate hydrate (97 %, Sigma-Aldrich Corp., St. Louis, Mo., USA) was dissolved with deionized water to a total weight of 21.2123 g. 2.61g of the ferric sulfate solution was then added to the reaction mixture and stirred for 2 minutes. A sodium persulfate solution made with 0.24g (2.04 mmoles) sodium persulfate (Fluka, Sigma-Aldrich Corp., St. Louis, Mo., USA) and 7.96g deionized water was dripped into the reaction mixture with a syringe pump in about 30 minutes. Polymerization was allowed to proceed with stirring at about 23° C. for 25 and half an hour.

The reaction mixture was treated with two ionic exchange resins. One of the two resins is Lewatit® S100, a trade name from Bayer, Pittsburgh, Pa., USA for sodium sulfonate of crosslinked polystyrene. The other ionic exchange resin is Lewatit® MP62 WS, a trade from Bayer, Pittsburgh, Pa., USA for free base/chloride of tertiary/quaternary amine of crosslinked polystyrene. Before use, the two resins were washed with deionized water separately until there was no color observed in the water. 2.42 g of Lewatit® S100 and 2.62 g of Lewatit® MP62® WS were then mixed with the reaction mixture in the Erlenmeyer flask for 5 hours. The resulting slurry was then suction pre-filtered through a coarse fritted-glass funnel and then through a Buchner Funnel containing two pieces of Whatman #4 Filter Paper. Not only was filtration easy, but also when finished there was no sedimentation on the Filter Paper. Yield is 105.63 g. Solid % (w/w) of the dispersion was about 1%. The pH of the dark filtrate was measured to be 4.4. Its dried (baked at 80° C. for 10 minutes in vacuo) film conductivity was $9.0 \times 10^{-7}$ S/cm.

The 1% (w/w) dispersion made above was concentrated to 2% and was spin-coated to thin film for measurement of contact angle as described below. A goniometer was used to dispense 3.0 μL drops of phenylhexane. Once a drop was dispensed, a snapshot was immediately taken, giving a visual outline of the drop. Each measurement calculated a right and left value for the contact angle. It was determined to be 27 degrees. This contact angle is low, indicating that the film surface can be wetted easily with organic solvents such as p-xylene and toluene. These solvents are commonly used for dissolving light-emitting materials.

Example 4

This example illustrates the use of the new conductive polymer composition as a buffer layer in an electronic device.

The 2% (w/w) aqueous dispersion made in Example 3 was tested for device performance. The dispersion was spun on a 30 mm×30 mm ITO/glass substrate. The substrate had an ITO thickness of 100 to 150 nm and consisted of 3 pieces of 5 mm×5 mm pixel and 1 piece of 2 mm×2 mm pixel for light emission. The spin-coated films as buffer layer layers were then baked at 90° C. in air for 30 minutes. Thickness of the baked buffer layers was ~100 nm. For the light-emitting layer, a 1% (w/v) p-xylene solution of green polyfluorene-based light-emitting polymer was spin-coated on top of the buffer layer films and subsequently baked at 90° C. in vacuum for 30 minutes. The final thickness was ~750 Å. Immediately after, a 4 nm thick barium layer and a 200 nm aluminum layer were deposited on the light-emitting polymer films to serve as a cathode. The devices drop from 3,600 nits to one half that value in 800 hrs, which is a long stress-life at that luminance level.

Example 5

This example illustrates the preparation of a conductive polymer composition by the oxidative polymerization of a precursor monomer in the presence of an organic solvent wettable fluorinated acid polymer. The precursor monomer was 3,4-ethylenedioxythiophene. The organic solvent wettable fluorinated acid polymer was $VF_2$-PSEBVE acid from Example 1.

42.59 g of aqueous solution of 2.89% $VF_2$-PSEBVE acid made in Example 1 and 65.18 g deionized water were poured into a 250 mL Erlenmeyer flask. The mixture was stirred with a magnetic stirrer for 10 minutes. 0.101 mL (0.948 mmoles) of Baytron-M (a trade name for 3,4-ethylenedioxythiophene from H. C. Starck, Massachusetts, USA) was added to the reaction solution with stirring. The mixture was stirred for 30 minutes. 2.99 g of the ferric sulfate stock solution made in Example 3 was then added to the reaction mixture and stirred for 2 minutes. A sodium persulfate solution made with 0.28 g (2.04 mmoles) sodium persulfate (Fluka, Sigma-Aldrich Corp., St. Louis, Mo., USA) and 9.11 g deionized water was dripped into the reaction mixture with a syringe pump in about 30 minutes. Polymerization was allowed to proceed with stirring at about 23° C. for 23 and half an hour.

The reaction mixture was mixed with 2.63 g of Lewatit® S100 and 2.59 g of Lewatit® MP62® WS in the Erlenmeyer flask and stirred for 5 hours. The resulting slurry was then suction pre-filtered through a coarse fritted-glass funnel and then through a Buchner Funnel containing two pieces of Whatman #4 Filter Paper. Not only was filtration easy, but also when finished there was no sedimentation on the Filter Paper. Yield is 105.61 g. Solid % (w/w) of the dispersion was about 1%. The pH of the dark filtrate was measured to be 4.3. Its dried (baked at 80° C. for 10 minutes in vacuo) film conductivity was $5.8 \times 10^{-4}$ S/cm.

The 1% (w/w) dispersion made above was concentrated to 2% and was spin-coated to thin film for measurement of contact angle as described in Example 3. It was determined to be 18 degrees. This contact angle is low, indicating that its film surface can be wetted easily by organic solvents such as p-xylene and toluene.

Example 6

This example illustrates the use of the new conductive polymer composition as a buffer layer in an electronic device. The conductive polymer composition was poly(3,4-ethylenedioxythiophene)NF2-PSEBVE from Example 5.

The 2% (w/w) aqueous dispersion made in Example 5 was tested for device performance. The dispersion was spun on a 30 mm×30 mm ITO/glass substrate. The substrate had an ITO thickness of 100 to 150 nm and consisted of 3 pieces of 5mm×5mm pixel and 1 piece of 2 mm×2 mm pixel for light emission. The spin-coated films as buffer layer layers were then baked at 90° C. in air for 30 minutes. The thickness of the baked buffer layers was 750 nm. For the light-emitting layer, a 1% (w/v) p-xylene solution of a green polyfluorene-based light-emitting polymer was spin-coated on top of the buffer layer films and subsequently baked at 90° C. in vacuum for 30 minutes. The final thickness was ~750 Å. Immediately after, a 4 nm thick barium layer and a 200 nm aluminum layer were deposited on the light-emitting polymer films to serve as a cathode. The devices dropped from 2,000 nits to 1000 nits (half-life) in 1200 hrs, which is a long stress-life at that luminance level.

Comparative Example A

This comparative example illustrates polymerization of EDT monomer in the presence of a Nafion®, which results in an electrically conducting polymer having high contact angle film surface. A 25% (w/w) aqueous colloidal dispersion of perfluroethylenesulfonic acid with an EW of 1050 used for the polymerization is made using a procedure similar to the procedure in U.S. Pat. No. 6,150,426, Example 1, Part 2, except that the temperature is approximately 270° C. The dispersion is diluted with water to form a 12.0% (w/w) dispersion for the polymerization.

Nafion® forms films which are not wettable by organic solvents. A small drop of the Nafion® was cast on a microscope slide. The film was dried at ~90° C. in a vacuum oven. A small drop of p-xylene was placed on the dried film. The liquid formed a ball-like droplet, which rolled around the surface easily. Phenylhexane will have a contact angle greater than 40° on films of Nafion®.

In a 2000 mL reaction kettle were put 722 g of 12% solid content aqueous Nafion® (82.52mmol $SO_3H$ groups) dispersion, 1525 g water, 0.121 g (0.24 mmol) iron(III)sulfate [$Fe_2(SO_4)_3$], and 1161 µL of ~37% HCl (14.15 mmol). The reaction mixture was stirred at 200 RPM using an overhead stirrer fitted with a double stage propeller type blade. Before addition of 7.02 g (29.47 mmol) sodium persulfate ($Na_2S_2O_8$) in 4 mL of water, and 2.51 ml (23.58 mmol) ethylenedioxythiophene (EDT) was started from separate syringes using addition rate of 2.86 mL/h for $Na_2S_2O_8$/water and 207 µL/h for EDT while continuously stirring at 200 RPM. The addition of EDT was accomplished by placing the monomer in a syringe connected to a Teflon® tube that led directly into the reaction mixture. The end of the Teflon® tube connecting the $Na_2S_2O_8$/water solution was placed above the reaction mixture such that the injection involved individual drops falling from the end of the tube. The reaction was stopped 7 hours after the addition of monomer had finished by adding 170 g of each Lewatit MP62WS and Lewatit Monoplus S100 ion-exchange resins, and 225 g of n-propanol to the reaction mixture and stirring it further for 7 hours at 130 RPM. The ion-exchange resin was finally filtered from the dispersion using Whatman No. 54 filter paper. The pH of the dispersion was 3.25. Films were formed by spin-coating the dispersion and baking at 130° C. for 10 minutes in air. These films had a conductivity of $5.6 \times 10^{-4}$ S/cm at room temperature.

The spin-coated films were also measured for contact angle as described in Example 3. It was determined to be 58.2 degrees. This contact angle is rather high, much higher than those in examples 3 and 5. The high contact angle surface is difficult to wet with organic solvents such as p-xylene and toluene. These solvents are commonly used for dissolving light-emitting materials.

Example 7

This example illustrates the preparation of a conductive polymer composition having low contact angle by an oxidative polymerization of aniline in the presence of an organic solvent wettable fluorinated sulfonic acid polymer. The precursor monomer was aniline. The organic-solvent wettable fluorinated sulfonic acid polymer was $VF_2$-PSEBVE acid from Example 1.

78.61 g of deionized water and 45.38 g of 99.7% n-propanol were massed directly into a 1000 ml reactor vessel at room temperature. Next, 0.0952 mL (1.2 mmol) of 37% wt. HCl and 0.6333 mL (7.0 mmol) of aniline (distilled) were added to the reactor via pipet. The mixture was stirred overhead with a U-shaped stir-rod set at 100 RPM. After five minutes, 53.60 g of 4.39% water solution of the polymer (5.80 mmol) made in Example 1 (10.90 mmol) was added slowly via a glass funnel. The mixture was allowed to homogenize at 200 rpm for an additional 10 minutes. 1.65 g (7.2 mmol) of ammonium persulfate (99.99+%) dissolved in 20 g of DI water was added drop wise to the reactants via syringe infusion pump in six hours. Eight minutes later the solution turned light turquoise. The solution progressed to being dark blue before turning very dark green. After the APS addition, the mixture was stirred for 60 minutes and 4.68 g of Amberlyst-15 (Rohm and Haas Co., Philadelphia, Pa.) cation exchange resin (rinsed multiple times with a 32% n-propanol/DI water mixture and dried under nitrogen) was added and the stirring commenced overnight at 200 RPM. The next morning, the mixture was filtered through steel mesh. pH of the Amberlyst 15 treated dipsersion was 1.2. A portion of the dispersion was stirred with Amberjet 4400 (OH) (Rohm and Haas Co., Philadelphia, Pa.) anion exchange resin (rinsed multiple times with a 32% n-propanol/Dl water mixture and dried under nitrogen) until the pH had changed from 1.2 to 5.7. The resin was again filtered off and the filtrate was a stable dispersion.

The dispersion was spun onto glass at 1,000 RPM for 80 seconds, resulting in films having a thickness of 831 Å once baked at 130° C. for 5 minutes in air and further baked at 200° C. for 10 minutes in a glove box. Conductivity was measured to be $4.0 \times 10^{-4}$ S/cm. The dispersion was also spin-coated to thin film for measurement of contact angle. The measurement is described in Example 3 and the film surface was measured to have contact angle of 20 degrees. This contact angle is very low, indicating that its film surface is easy to wet by the organic solvents such as p-xylene, and toluene. The solvents are common ones for dissolving light emitting materials.

Example 8

This example illustrates the use of the new conductive polymer composition as a buffer layer in an electronic device. The conductive polymer composition was polyaniline/VF2-PSEBVE from Example 7.

The polyaniline/poly(VF2/PSEBVE acid) was then tested for device performance. The polyaniline dispersion was spun on a 6"×6" glass plate. The plate had an ITO thickness of 100 to 150 nm and consisted of 16 backlight substrates. Each substrate consisted of 3 pieces of 5 mm×5 mm pixel and 1 piece of 2 mm×2 mm pixel for light emission. The spin-coated films as buffer layer layers were then baked at 130° C. for 5 minutes on a hot-plate in air. The thickness of the baked buffer layers was 80 nm. For the light-emitting layer, a 1 % (w/v) toluene solution of a green light-emitting fluorene polymer was spin-coated on top of the buffer layer films and subsequently baked at 130° C. for 10 minutes on a hot plate in an inert atmosphere glove box. The green light-emitting layer thickness was 75 nm. Immediately after, a 3 nm thick barium layer and a 350-400 nm aluminum layer were deposited on the green light-emitting films to serve as a cathode. The devices had efficiency of 14.3 cd/Amp at 1,000 cd/m² (nit) and operation lifetime of 600 to 650 hrs at 5,000 nits.

Comparative Example B

This comparative example illustrates polymerization of aniline monomer in the presence of DE1020, a commercial Nafion® from Dupont Company (Wilmington, Del., USA). This Nafion® also forms films having a high contact angle surface.

455.83 g of Dl water and 440.86 g of 99.7% n-propanol were massed directly into a 2 L glass reactor vessel at room temperature. Next, 0.942 mL (11.49 mmol) of 37% wt. HCl and 6.29 mL (68.96 mmol) of aniline (distilled) were added to the reactor via pipet. The mixture was stirred overhead with a U-shaped stir-rod set at 350 RPM. After seven minutes, 479.37 g (57.46 mmol) of water-dispersed Nafion® (DE-1020, 11.4% solids, 951.0 EW) that had been passed through a 0.3 μm profile filter, was added slowly via glass funnel. The mixture was allowed to homogenize for an additional 17 minutes. 16.39 g (71.83 mmol) of ammonium persulfate (99.99+%) dissolved in 100 g of Dl water was added drop wise at 8.34 ml/hr to the reactants via syringe infusion pump. After five minutes, the solution turned light turquoise. The solution progressed to being dark blue before turning very dark green. After completion of APS addition, the mixture was stirred for additional one hour before addition of 35 g of Amberlyst-15 (Rohm and Haas Co., Philadelphia, Pa.) cation exchange resin (rinsed multiple times with a 32% n-propanol/Dl water mixture and dried under nitrogen) was added and the stirring commenced overnight at 150 RPM. The next morning, the mixture was filtered through steel mesh and stirred with Amberjet 4400 (OH) (Rohm and Haas Co., Philadelphia, Pa.) anion exchange resin (rinsed multiple times with a 32% n-propanol (in Dl water) mixture and dried under nitrogen) until the pH had changed from 1.35 to 5.8. The resin was again filtered off and the filtrate was a stable dispersion. Solid % of the dispersion is about 4%(w/w).

The dispersion was also spin-coated to thin film for measurement of contact angle. The measurement is described in Example 3. It was determined to be 57 degrees. This contact angle is very high, indicating that its film surface is difficult to wet with the organic solvents such as p-xylene, toluene.

Example 9

This example illustrates preparation of an organic solvent wettable sulfonic acid polymer to be used in the preparation of a new conductive polymer composition illustrated in Example 10. The polymer is a copolymer of tetrafluoroethylene (TFE) and 3,3,4-trifluoro-4-(perfluorosulfonylethoxy)-tricyclo[$4.2.1.0^{2,5}$]-non-7-ene (NBD-PSEVE), which is subsequently converted to the sulfonic acid form. The resulting polymer is abbreviated as "TFE/NBD-PSEVE".

a) Synthesis of 3.3.4-trifluoro-4-(perfluorosulfonylethoxy)-tricyclo[$4.2.1.0^{2,5}$]-non-7-ene (NBD-PSEVE)

A 1000 mL Hastelloy C276 reaction vessel was charged with a mixture of 2,5-norbornadiene (98%, Aldrich, 100 g), and hydroquinone (0.5 g). The vessel was cooled to –6° C., evacuated to –20 PSIG, and purged with nitrogen. The pressure was again reduced to –20 PSIG and 2-(1,2,2-trifluorovinyloxy)-1,1,2,2-tetrafluoroethanesulfonyl fluoride (305 g) was added. The vessel was agitated and heated to 190° C. at which time the inside pressure was 126 PSIG. The reaction temperature was maintained at 190° C. for 6 h. The pressure dropped to 47 PSIG at which point the vessel was vented and cooled to 25° C.

The crude monomer was distilled using a spinning-band column (BP =110-120° C. @ 40 Torr, 2100 RPM) to afford 361 g of colorless liquid consisting of a mixture of isomers. The chemical structure was confirmed by both GCMS and $^{19}$F and $^1$H NMR. MS: m/e 372 (M$^+$), 353 (base, M$^+$-F), 289 (M$^+$—SO$_2$F), 173 (C$_9$H$_8$F$_3^+$).

b) Synthesis of a TFE and NBD-PSEVE sulfonyl fluoride copolymer

A 400 mL pressure vessel was swept with nitrogen and charged with 74.4 g (0.20 mol) of NBD-PSEVE, 50 mL of Solkane 365 mfc (1,1,1,3,3-pentafluorobutane) and 0.80 g of Perkadox® 16N. The vessel was closed, cooled in dry ice, evacuated, and charged with 30 g (0.30 mol) of TFE. The vessel contents were heated to 50° C. and agitated for 18 hr as the internal pressure decreased from 194 psi to 164 psi. The vessel was cooled to room temperature and vented to one atmosphere. The vessel contents were added slowly to excess hexane. The solid was filtered, washed with hexane and dried in a vacuum oven at about 80° C. There was isolated 32.3 g of the white copolymer. Its fluorine NMR spectrum showed peaks at +44.7 (1F, $SO_2F$), −74 to −87 (2F, $OCF_2$), −95 to −125 ($CF_2$, 4F from NBD-PSEVE and 4F from TFE), −132.1 (1F, CF). From integration of the NMR, polymer composition was calculated to be 48% TFE and 52% NBD-PSEVE. GPC analysis: Mn=9500, Mw=17300, Mw/Mn=1.82. DSC: Tg at 207° C. Anal. Found: C, 33.83; H, 1.84; F, 45.57.

b) Hydrolysis of a TFE/NBD-PSEVE sulfonyl fluoride copolymer for conversion to acid copolymer 22.53 g (48.5 mmoles —$SO_2F$) TFE/NBD-PSEVE were placed in a 1000 mL distillation flask. This flask was equipped with a magnetic stirrer, condenser and nitrogen inlet adapter. To the flask, 350 mL methanol/water mixture (1:1 v/v) and 19.24 g (200 mmoles) ammonium carbonate were added. The flask was then immersed in an oil bath heated to 75° C. for 24 hours. $^{19}$F-NMR shows the absence of ~δ40, indicating that the sulfonyl fluoride was hydrolyzed to below the detection limit.

The entire content (~376 g) of the hydrolyzed mixture was further treated for conversion to acid. 30 g protonic exchange resins were added to the mixture and left stirred for 1 hr. The resin was filtered and fresh 30 g acidic resins were added and left stirred for 15 hrs and filtered again. The filtrate was treated with fresh 20 g acidic resins for half an hour and again the filtrate was treated with fresh 30 g acidic resins for half an hour. The final filtrate was then placed in a round bottom flask which was immersed in an oil bath heated to 60° C. Once two thirds of the content were removed through evaporation, the oil bath heat was turned off until the content became dried. Dried solid, which was yellowish, weighed 18.5 g.

A few pieces of the solid were dissolved in water which turned it acidic. A couple drops of the solution were cast on a microscope slide. It formed a smooth continuous film. The film surface can be wetted easily with p-xylene, which is one of common solvents for light emitting materials.

Example 10

This example illustrates the preparation of a conductive polymer composition by the oxidative polymerization of a precursor monomer in the presence of an organic solvent wettable fluorinated acid polymer. The precursor monomer was 3,4-ethylenedioxythiophene. The organic solvent wettable fluorinated acid polymer was TFE/NBD-PSEVE acid from Example 9. 132 g deionized water were poured into a 500 mL Erlenmeyer flask which had 1.302 g TFE/NBD-PSEVE (2.814 mmolespoly-acid monomer) acid solid made in example 9. The polymer solid dissovled very quickly, as soon as the water was added. To the solution, 0.0208 g 37% (w/w) HCl solution was added. A stock solution of ferric sulfate was made first by dissolving 0.0798 g ferric sulfate hydrate (97%, Sigma-Aldrich Corp., St. Louis, Mo., USA) with deionized water to a total weight of 12.4098 g. 1.9806 g (0.0246 mmoles) of the ferric sulfate solution were added to the acid solution. A stock solution of sodium persulfate was made by dissolving 0.30 g sodium persulfate (Fluka, Sigma-Aldrich Corp., St. Louis, Mo., USA) with deionized water to a total weight of 2.3079 g. 2.2953 g (1.253 mmoles) of the sodium persulfate solution were added to the acid solution flask. The mixture was then stirred for 30 minutes in the reaction vessel. 0.1417 g (0.997 mmoles) of Baytron-M (a trade name for 3,4-ethylenedioxythiophene from H. C. Starck, Massachusett) was added to the reaction mixture with stirring. Polymerization was allowed to proceed with stirring at about 23° C. The polymerization liquid turned blue in less than 20 minutes and then turned dark blue in one hour. It was transferred to a plastic bottle in 15 hrs. 6 g Amberlyst 15 acid exchange resin and 6 g Lewatit MP62 WS base resin were added to the bottle to quench the polymerization and to remove impurities. After 25 hrs, the resins were filtered. The liquid contains about 1.1% electrically conductive poly(3,4-ethylenedioxythiophene) in which the positively charged backbones are charge-balanced by NBD/TFE-PSEVE polymeric anions. The aqueous dispersion of the conducting polymer formed smooth, continuous film. Conductivity of dried film backed at 130° C. in air for five minutes was measured to be $7.7 \times 10^{-5}$ S/cm. The film surface can be wetted easily with either p-xylene or toluene.

Example 11

This example illustrates the preparation of poly(perfluorobutanesulfonimide), which produces films with surfaces having good wettability:

Inside a nitrogen-purged glove box, a dry 50 mL round bottom flask (RBF) equipped with a stirring bar, reflux condenser, and septum was charged with perfluorobutane-1,4-disulfonyl difluoride (3.662 g, 10 mmol), anhydrous acetonitrile (15 mL), perfluorobutane-1,4-disulfonamide (3.602 g, 10 mmol), and anhydrous triethylamine (5.6 mL, 40 mmol). The solution was heated to a reflux overnight under nitrogen. The solution was transferred to a 500 mL RBF and treated with sodium hydroxide (1.65 g, 41 mmol), calcium chloride (1.11 g, 10 mmol), and 200 mL deionized water. The solution was evaporated on a rotary evaporator under reduced pressure and the residue dried under vacuum. $^1$H NMR (DMSO) showed the absence of triethylamine. The residue was dissolved in 200 mL deionized water, treated with decolorizing carbon, and heated to a reflux. The cooled mixture was treated with filter aid and filtered using a stainless steel filter funnel fitted with a glass microfiber pre-filter and 5.0 μm PTFE membrane filter by applying nitrogen pressure. The filter was washed with additional deionized water to dilute the solution to 400 mL. The clear solution was slowly eluted through an ion-exchange column that contained 200 g of Dowex® 50WX8-100 ion-exchange resin (strongly acidic, 8% crosslink, 50-100 mesh), which had been washed with methanol followed by water and conditioned by eluting with 250 mL 1 N hydrochloric acid followed by deionized water. The acidic aqueous fractions were collected by eluting the column with additional deionized water, evaporated on a rotary evaporator under reduced pressure, and the residue dried under vacuum to give 6.03 g for an 87.9% yield. $^{19}$F NMR ($CD_3CN$): −120.95 (m, —$CF_2$—$CF_2$—), −113.78 (m, 2 —$CF_2$—$SO_2$—). The integrations for the sulfonamide (—$CF_2$—$SO_2$—$NH_2$) and sulfonic acid (—$CF_2$—$SO_3H$) end group peaks at −114.33 and −115.45, respectively, indicated a degree of polymerization of 27, which translates to a number average molecular weight of 9,430.

The poly(perfluorobutanesulfonimide) is very soluble in water. A small drop of the polymer in water was cast on a microscope slide and dried at ~90° C. in a vacuum oven. The film was wetted very easily with p-xylene or toluene. The organic solvents are common organic solvents for light emitting materials.

Example 12

This example illustrates the preparation of a conductive polymer composition by the oxidative polymerization of a precursor monomer in the presence of an organic solvent wettable fluorinated polymeric sulfonimide.

The procedure of Example 3 will be repeated, but substituting the poly(perfluorobutanesulfonimide) from Example 9 for the E-PSEPVE acid. The resulting aqueous dispersion of conductive polymer composition will form films that are electrically conductive and wettable by organic solvents.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

It is to be appreciated that certain features of the invention which are, for clarity, described above and below in the context of separate embodiments, may also be provided in combination in a single embodiment. Conversely, various features of the invention that are, for brevity, described in the context of a single embodiment, may also be provided separately or in any subcombination. Further, references to values stated in ranges include each and every value within that range.

What is claimed is:

1. A polymer composition comprising:
   at least one electrically conductive polymer; and
   at least one organic solvent wettable fluorinated acid polymer, wherein the fluorinated acid polymer is selected from the group consisting of a copolymer of 1,1-difluoroethylene and 2-(2,2-difluoro-2-(trifluoromethyl)allyloxy)-1,1,2,2-tetrafluoroethanesulfonic acid; a copolymer of ethylene and 2-(2-(1,2,2-trifluorovinyloxy)-1,1,2,3,3,3-hexafluoropropoxy)-1,1,2,2-tetrafluoroethanesulfonic acid, and combinations thereof; or wherein the fluorinated acid polymer is derived from at least one monomer having Formula VII

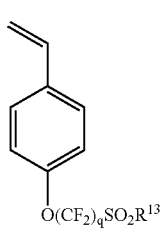

(VII)

where:
   q is an integer from 1 to 5,
   $R^{13}$ is OH or $NHR^{14}$, and
   $R^{14}$ is alkyl, fluoroalkyl, sulfonylalkyl, or sulfonylfluoroalkyl;
   and Formula VIII

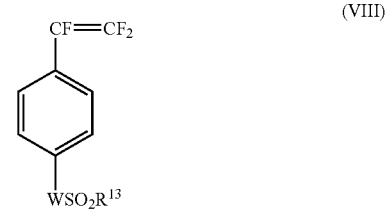

(VIII)

where:
   W is selected from $(CF_2)_q$, $O(CF_2)_q$, $S(CF_2)_q$, $(CF_2)_qO(CF_2)_r$,
   q and r are independently an integer from 1 to 5,
   $R^{13}$ is OH or $NHR^{14}$, and
   $R^{14}$ is alkyl, fluoroalkyl, sulfonylalkyl, or sulfonylfluoroalkyl, 2. The composition of claim 1, wherein the electrically conductive polymer is selected from a polythiophene.

3. The composition of claim 2, wherein the polythiophene has Formula I:

(I)

wherein:
   $R^1$ is independently selected so as to be the same or different at each occurrence and is selected from hydrogen, alkyl, alkenyl, alkoxy, alkanoyl, alkythio, aryloxy, alkylthioalkyl, alkylaryl, arylalkyl, amino, alkylamino, dialkylamino, aryl, alkylsulfinyl, alkoxyalkyl, alkylsulfonyl, arylthio, arylsulfinyl, alkoxycarbonyl, arylsulfonyl, acrylic acid, phosphoric acid, phosphonic acid, halogen, nitro, cyano, hydroxyl, epoxy, silane, siloxane, alcohol, benzyl, carboxylate, ether, ether carboxylate, amidosulfonate, ether sulfonate, ester sulfonate, and urethane; or both $R^1$ groups together may form an alkylene or alkenylene chain completing a 3, 4, 5, 6, or 7-membered aromatic or alicyclic ring, which ring may optionally include one or more divalent nitrogen, sulfur or oxygen atoms, and n is at least about 4.

4. The composition of claim 2, wherein the polythiophene has Formula I(a):

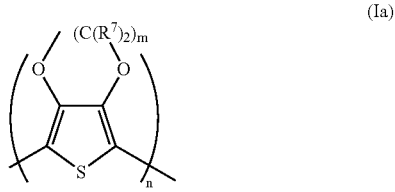

(Ia)

wherein:
R$^7$ is the same or different at each occurrence and is selected from hydrogen, alkyl, heteroalkyl, alkenyl, heteroalkenyl, alcohol, amidosulfonate, benzyl, carboxylate, ether, ether carboxylate, ether sulfonate, ester sulfonate, and urethane, with the proviso that at least one R$^7$ is not hydrogen
m is 2 or 3, and
n is at least about 4.

5. The composition of claim 2, wherein the polypyrrole has Formula II:

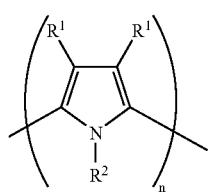

where in Formula II:
n is at least about 4;
R$^1$ is independently selected so as to be the same or different at each occurrence and is selected from hydrogen, alkyl, alkenyl, alkoxy, alkanoyl, alkythio, aryloxy, alkylthioalkyl, alkylaryl, arylalkyl, amino, alkylamino, dialkylamino, aryl, alkylsulfinyl, alkoxyalkyl, alkylsulfonyl, arylthio, arylsulfinyl, alkoxycarbonyl, arylsulfonyl, acrylic acid, phosphoric acid, phosphonic acid, halogen, nitro, cyano, hydroxyl, epoxy, silane, siloxane, alcohol, benzyl, carboxylate, ether, amidosulfonate, ether carboxylate, ether sulfonate, ester sulfonate, and urethane; or both R$^1$ groups together may form an alkylene or alkenylene chain completing a 3, 4, 5, 6, or 7-membered aromatic or alicyclic ring, which ring may optionally include one or more divalent nitrogen, sulfur or oxygen atoms; and
R$^2$ is independently selected so as to be the same or different at each occurrence and is selected from hydrogen, alkyl, alkenyl, aryl, alkanoyl, alkylthioalkyl, alkylaryl, arylalkyl, amino, epoxy, silane, siloxane, alcohol, benzyl, carboxylate, ether, ether carboxylate, ether sulfonate, ester sulfonate, and urethane.

6. The composition of claim 2, wherein the polyaniline has a formula selected from Formula III, Formula IV, and combinations thereof:

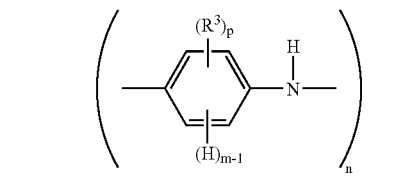

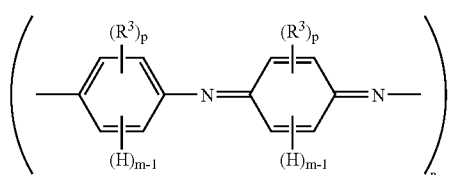

wherein:
n is at least about 4;
p is an integer from 0 to 4;
m is an integer from 1 to 5, with the proviso that p+m=5; and
R$^3$ is independently selected so as to be the same or different at each occurrence and is selected from alkyl, alkenyl, alkoxy, cycloalkyl, cycloalkenyl, alkanoyl, alkythio, aryloxy, alkylthioalkyl, alkylaryl, arylalkyl, amino, alkylamino, dialkylamino, aryl, alkylsulfinyl, alkoxyalkyl, alkylsulfonyl, arylthio, arylsulfinyl, alkoxycarbonyl, arylsulfonyl, carboxylic acid, halogen, cyano, or alkyl substituted with one or more of sulfonic acid, carboxylic acid, halo, nitro, cyano or epoxy moieties; or any two R$^3$ groups together may form an alkylene or alkenylene chain completing a 3, 4, 5, 6, or 7-membered aromatic or alicyclic ring, which ring may optionally include one or more divalent nitrogen, sulfur or oxygen atoms.

7. The composition of claim 2, wherein the polymeric fused polycyclic heteroaromatic is derived from a monomer having Formula V:

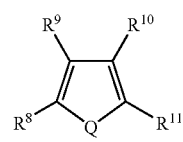

wherein:
Q is S or NH;
R$^8$, R$^9$, R$^{10}$, and R$^{11}$ are independently selected so as to be the same or different at each occurrence and are selected from hydrogen, alkyl, alkenyl, alkoxy, alkanoyl, alkythio, aryloxy, alkylthioalkyl, alkylaryl, arylalkyl, amino, alkylamino, dialkylamino, aryl, alkylsulfinyl, alkoxyalkyl, alkylsulfonyl, arylthio, arylsulfinyl, alkoxycarbonyl, arylsulfonyl, acrylic acid, phosphoric acid, phosphonic acid, halogen, nitro, cyano, hydroxyl, epoxy, silane, siloxane, alcohol, benzyl, carboxylate, ether, ether carboxylate, amidosulfonate, ether sulfonate, ester sulfonate, and urethane; and
at least one of R$^8$ and R$^9$, R$^9$ and R$^{10}$, and R$^{10}$ and R$^{11}$ together form an alkenylene chain completing a 5 or 6-membered aromatic ring, which ring may optionally include one or more divalent nitrogen, sulfur or oxygen atoms.

8. The composition of claim 1, wherein the electrically conductive polymer is derived from a precursor monomer having Formula VI:

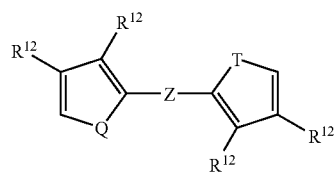

wherein:
Q is S or NR$^6$;
T is selected from S, NR$^6$, O, SiR$^6{}_2$, Se, and PR$^6$;
Z is selected from alkenylene, arylene, and heteroarylene;
R$^6$ is hydrogen or alkyl;
R$^{12}$ is the same or different at each occurrence and is selected from hydrogen, alkyl, alkenyl, alkoxy, alkanoyl, alkythio, aryloxy, alkylthioalkyl, alkylaryl, arylalkyl, amino, alkylamino, dialkylamino, aryl, alkylsulfinyl, alkoxyalkyl, alkylsulfonyl, arylthio, arylsulfinyl, alkoxycarbonyl, arylsulfonyl, acrylic acid, phosphoric acid, phosphonic acid, halogen, nitro, nitrile, cyano, hydroxyl, epoxy, silane, siloxane, alcohol, benzyl, carboxylate, ether, ether carboxylate, amidosulfonate, ether sulfonate, ester sulfonate, and urethane.

9. The composition of claim 1, wherein the electrically conductive polymer is selected from poly(3,4-ethylenedioxythiophene), poly(thieno(2,3-b)thiophene), poly(thieno(3,2-b)thiophene), and poly(thieno(3,4-b)thiophene).

10. The composition of claim 1, wherein the organic solvent wettable fluorinated acid polymer forms a film which is wettable by phenylhexane with a contact angle no greater than 40°.

11. The composition of claim 10, wherein the contact angle is no greater than 35°.

12. A method of making an aqueous dispersion of a polymer composition comprising at least one electrically conductive polymer; and at least one organic solvent wettable fluorinated acid polymer, said method comprising forming a reaction mixture by combining water, at least one precursor monomer, at least one organic solvent wettable fluorinated acid polymer, and an oxidizing agent, in any order, provided that at least a portion of the fluorinated sulfonic acid polymer is present when at least one of the precursor monomer and the oxidizing agent is added, wherein the fluorinated acid polymer is selected from the group consisting of a copolymer of 1,1-difluoroethylene and 2-(2,2-difluoro-2-(trifluoromethyl)allyloxy)-1,1,2,2-tetrafluoroethanesulfonic acid; a copolymer of ethylene and 2-(2-(1,2,2-trifluorovinyloxy)-1,1,2,3,3,3-hexafluoropropoxy) -1,1,2,2-tetrafluoroethanesulfonic acid, and combinations thereof; or wherein the fluorinated acid polymer is derived from at least one monomer having Formula VII

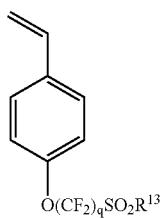

(VII)

where:
q is an integer from 1 to 5,
$R^{13}$ is OH or $NHR^{14}$, and
$R^{14}$ is alkyl, fluoroalkyl, sulfonylalkyl, or sulfonylfluoroalkyl;
and Formula VIII

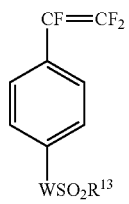

(VIII)

where:
W is selected from $(CF_2)_q$, $O(CF_2)_q$, $S(CF_2)_q$,$(CF_2)_qO(CF_2)_r$,
q and r are independently an integer from 1 to 5,
$R^{13}$ is OH or $NHR^{14}$, and
$R^{14}$ is alkyl, fluoroalkyl, sulfonylalkyl, or sulfonylfluoroalkyl.

13. The method of claim 12, wherein the reaction mixture further comprises at least one co-dispersing liquid.

14. The method of claim 13, wherein the co-dispersing liquid is an organic solvent selected from n-propanol, isopropanol, t-butanol, dimethylacetamide, dimethylformamide, N-methylpyrrolidone, and mixtures thereof.

15. The method of claim 12, wherein the reaction mixture further comprises a co-acid.

16. The method of claim 12, further comprising contacting the aqueous dispersion with at least one ion exchange resin.

17. An aqueous dispersion of polymer composition comprising at least one electrically conductive polymer and at least one organic solvent wettable fluorinated acid polymer, wherein the composition has a pH between 1.5 and 5, and wherein the fluorinated acid polymer is selected from the group consisting of a copolymer of 1,1-difluoroethylene and 2-(2,2-difluoro-2-(trifluoromethyl)allyloxy)-1,1,2,2-tetrafluoroethanesulfonic acid; a copolymer of ethylene and 2-(2-(1,2,2-trifluorovinyloxy)-1,1,2,3,3,3-hexafluoropropoxy) -1,1,2,2-tetrafluoroethanesulfonic acid, and combinations thereof; or wherein the fluorinated acid polymer is derived from at least one monomer having Formula VII

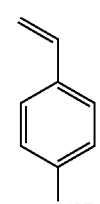

(VII)

where:
q is an integer from 1 to 5,
$R^{13}$ is OH or $NHR^{14}$, and
$R^{14}$ is alkyl, fluoroalkyl, sulfonylalkyl, sulfonylfluoroalkyl;
and Formula VIII

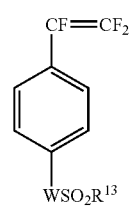

(VIII)

where:
W is selected from $(CF_2)_q$, $O(CF_2)_q$, $S(CF_2)_q$,$(CF_2)_qO(CF_2)_r$,
q and r are independently an integer from 1 to 5,
$R^{13}$ is OH or $NHR^{14}$, and
$R^{14}$ is alkyl, fluoroalkyl, sulfonylalkyl, or sulfonylfluoroalkyl.

18. The dispersion of claim 17, wherein the pH is between 3 and 4.

19. An electronic device comprising at least one buffer layer comprising a polymer composition comprising at least one electrically conductive polymer and at least one organic solvent wettable fluorinated acid polymer, wherein the fluorinated acid polymer is selected from the group consisting of a copolymer of 1,1-difluoroethylene and 2-(2,2-difluoro-2-(trifluoromethyl)allyloxy)-1,1,2,2-tetrafluoroethanesulfonic acid; a copolymer of ethylene and 2-(2-(1,2,2-trifluorovinyloxy)-1,1,2,3,3,3-hexafluoropropoxy)-1,1,2,2-tetrafluoroethanesulfonic acid, and combinations thereof; or wherein the fluorinated acid polymer is derived from at least one monomer having Formula VII

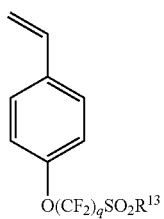

(VII)

where:
q is an integer from 1 to 5,
$R^{13}$ is OH or $NHR^{14}$, and
$R^{14}$ is alkyl, fluoroalkyl, sulfonylalkyl, sulfonylfluoroalkyl;

and Formula VIII

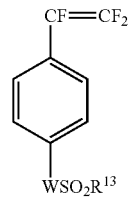

(VIII)

where:
W is selected from $(CF_2)_q$, $O(CF_2)_q$, $S(CF_2)_q$, $(CF_2)_qO(CF_2)_r$,
q and r are independently an integer from 1 to 5,
$R^{13}$ is OH or $NHR^{14}$, and
$R^{14}$ is alkyl, fluoroalkyl, sulfonylalkyl, or sulfonylfluoroalkyl.

20. The device of claim 19, wherein the electrically conductive polymer is selected from a polythiophene, a polypyrrole, a polyaniline, a polymeric fused polycyclic heteroaromatic, a copolymer thereof, and combinations thereof.

21. The device of claim 19, wherein the electrically conductive polymer is selected from poly(3,4-ethylenedioxythiophene), unsubstituted polypyrrole, unsubstituted polyaniline, poly(thieno(2,3-b)thiophene), poly(thieno(3,2-b)thiophene), and poly(thieno(3,4-b)thiophene).

* * * * *